(12) United States Patent
Robertson et al.

(10) Patent No.: US 11,500,536 B2
(45) Date of Patent: Nov. 15, 2022

(54) NEURAL NETWORK SYSTEM FOR GESTURE, WEAR, ACTIVITY, OR CARRY DETECTION ON A WEARABLE OR MOBILE DEVICE

(71) Applicant: Snap Inc., Santa Monica, CA (US)

(72) Inventors: John James Robertson, Los Angeles, CA (US); Zsolt Mathe, Sherman Oaks, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/245,997

(22) Filed: Apr. 30, 2021

(65) Prior Publication Data

US 2021/0255763 A1 Aug. 19, 2021

Related U.S. Application Data

(62) Division of application No. 16/569,884, filed on Sep. 13, 2019, now Pat. No. 10,996,846.

(Continued)

(51) Int. Cl.
*G06F 3/0488* (2022.01)
*G06F 3/0346* (2013.01)
(Continued)

(52) U.S. Cl.
CPC ........ *G06F 3/04883* (2013.01); *G06F 3/0346* (2013.01); *G06F 3/0485* (2013.01);
(Continued)

(58) Field of Classification Search
CPC ........ G06F 3/014; G06F 3/017; G06F 3/0346; G06F 3/041; G06F 3/012; G06F 3/0488;
(Continued)

(56) References Cited

U.S. PATENT DOCUMENTS 10,996,846 B2 5/2021 Robertson et al.
2005/0246109 A1 11/2005 Bang et al.
(Continued)

OTHER PUBLICATIONS

International Search Report and Written Opinion for International Application No. PCT/US2019/050985, dated Mar. 10, 2020 (Mar. 10, 2020)—24 pages.

(Continued)

*Primary Examiner* — Dong Hui Liang
(74) *Attorney, Agent, or Firm* — Culhane Meadows PLLC; Stephen J. Weed

(57) ABSTRACT

A neural network system includes an eyewear device. The eyewear device has a movement tracker, such as an accelerometer, gyroscope, or an inertial measurement unit for measuring acceleration and rotation. The neural network system tracks, via the movement tracker, movement of the eyewear device from at least one finger contact inputted from a user on an input surface. The neural network system identifies a finger gesture by detecting at least one detected touch event based on variation of the tracked movement of the eyewear device over a time period. The neural network system adjusts the image presented on the image display of the eyewear device based on the identified finger gesture. The neural network system can also detect whether the user is wearing the eyewear device and identify an activity of the user wearing the eyewear device based on the variation of the tracked movement over the time period.

18 Claims, 17 Drawing Sheets

Related U.S. Application Data

(60) Provisional application No. 62/738,093, filed on Sep. 28, 2018.

(51) Int. Cl.
| | | |
|---|---|---|
| *G06F 3/0484* | (2022.01) | |
| *G06F 3/0485* | (2022.01) | |
| *G06F 3/0486* | (2013.01) | |
| *G06N 3/04* | (2006.01) | |
| *G06N 3/08* | (2006.01) | |
| *G06F 3/04883* | (2022.01) | |
| *G06F 3/04845* | (2022.01) | |

(52) U.S. Cl.
CPC ........ *G06F 3/0486* (2013.01); *G06F 3/04845* (2013.01); *G06N 3/04* (2013.01); *G06N 3/08* (2013.01); *G06F 2203/04806* (2013.01)

(58) Field of Classification Search
CPC .... G06F 3/016; G06F 3/0482; G06F 3/04845; G06F 3/038; G06F 3/0416; G06F 1/163; G06F 1/1694; G06F 1/1626; G06F 1/1643; G06F 2203/0331; G06F 2200/1636; G06N 20/00; G06N 20/20; G06N 3/08; G06N 3/0454; G06N 7/005; G06N 5/04
See application file for complete search history.

(56) References Cited

U.S. PATENT DOCUMENTS

| | | |
|---|---|---|
| 2010/0060604 A1 | 3/2010 | Zwart et al. |
| 2010/0256947 A1 | 10/2010 | Kim et al. |
| 2011/0109546 A1 | 5/2011 | Milne et al. |
| 2012/0235885 A1* | 9/2012 | Miller ............... G06F 3/011 345/8 |
| 2014/0327655 A1 | 11/2014 | Avrahami et al. |
| 2015/0186793 A1 | 7/2015 | Ioffe et al. |
| 2015/0281009 A1* | 10/2015 | Melcher ........... G06Q 30/0633 709/224 |
| 2016/0267771 A1* | 9/2016 | Baek ................. H04B 1/385 |
| 2016/0335534 A1 | 11/2016 | Nere et al. |
| 2018/0075659 A1 | 3/2018 | Browy et al. |
| 2018/0322393 A1* | 11/2018 | Pau .................. G06N 3/088 |
| 2018/0348853 A1 | 12/2018 | Shchur et al. |
| 2019/0042894 A1 | 2/2019 | Anderson |
| 2019/0364355 A1 | 11/2019 | Tan et al. |

OTHER PUBLICATIONS

Partial International Search Report and Provisional Opinion Accompanying the Partial Search Result for International Application No. PCT/US2019/050985, dated Jan. 13, 2020 (Jan. 13, 2020)—21 pages.

* cited by examiner

NEURAL NETWORK SYSTEM FOR GESTURE, WEAR, ACTIVITY, OR CARRY DETECTION ON A WEARABLE OR MOBILE DEVICE

CROSS-REFERENCE TO RELATED APPLICATIONS

This application is a divisional of U.S. patent application Ser. No. 16/569,884, filed Sep. 13, 2019, which claims priority to U.S. Provisional Application Ser. No. 62/738,093 filed on Sep. 28, 2018, which applications are hereby incorporated herein by reference in their entireties.

TECHNICAL FIELD

The present subject matter relates to wearable devices, e.g., eyewear devices, and mobile devices and techniques to detect user gestures and wear detection.

BACKGROUND

Computing devices, such as wearable devices, including portable eyewear devices (e.g., smartglasses, headwear, and headgear), necklaces, and smartwatches and mobile devices (e.g., tablets, smartphones, and laptops) integrate image displays and cameras. Viewing and interacting with the displayed content on the devices can be difficult due to the small image display area available on the wearable device and mobile device.

For example, size limitations and the form factor of a wearable device, such as the eyewear device, can make a user interface difficult to incorporate into the eyewear device. The available area for placement of various control buttons on an eyewear device, e.g., to operate a camera, and graphical user interface elements on the image display of the eyewear device is limited. Due to the small form factor of the eyewear device, manipulation and interacting with, for example, displayed content on an image display is cumbersome.

Accordingly, a need exists to simply user interactions with wearable devices, including eyewear devices, and mobile devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a movement tracker such as shown in any of the drawings, are given by way of example only, for illustration and discussion purposes. In operation for gesture, wear, or activity detection the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any movement tracker or component of the movement tracker constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1A:
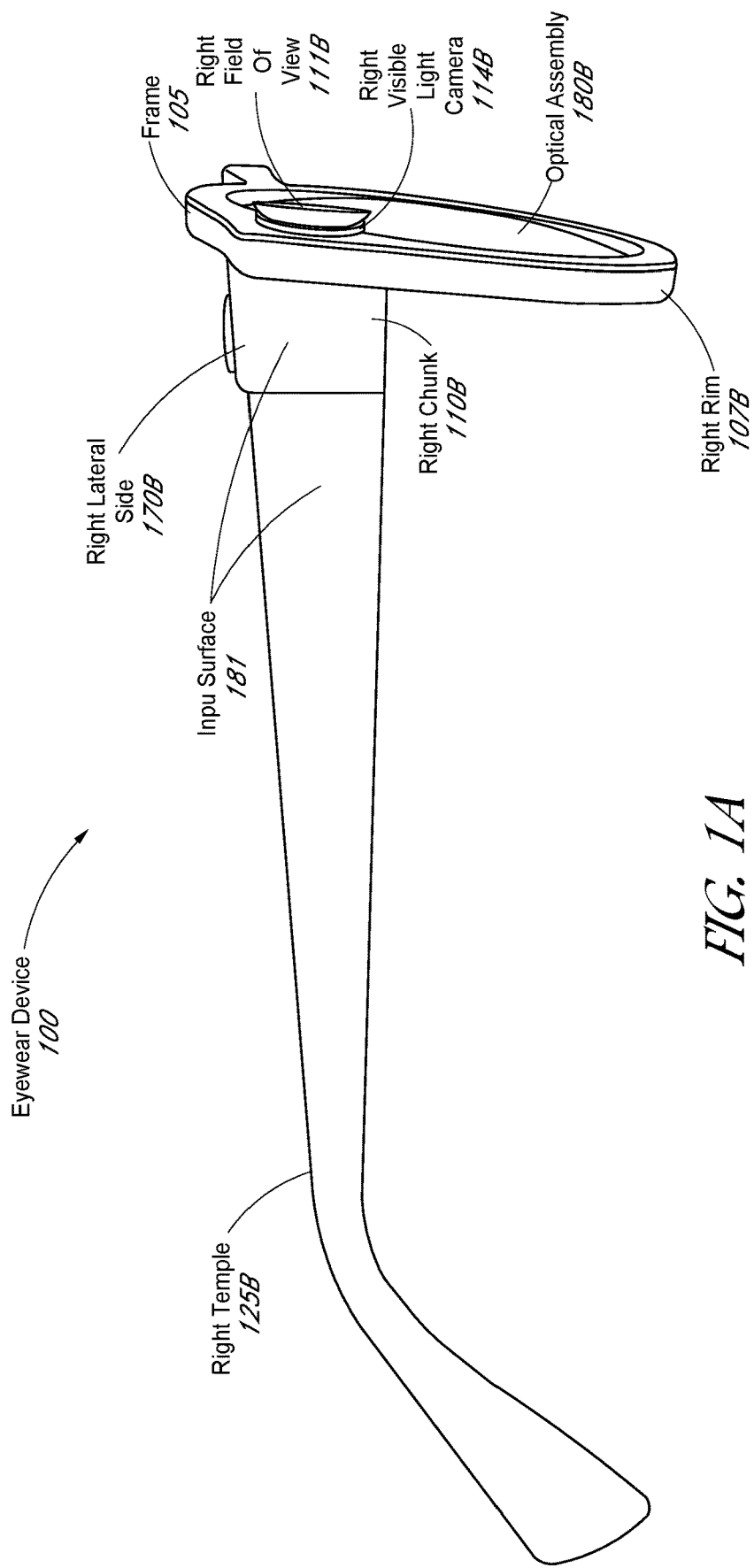
FIG. 1A is a right side view of an example hardware configuration of an eyewear device, which includes a movement tracker, utilized in a neural network system for gesture, wear, and activity detection.

FIG. 1A is a right side view of an example hardware configuration of an eyewear device 100, which includes a movement tracker (not shown), utilized in a neural network system for gesture, wear, and activity detection. Eyewear device 100, includes a right optical assembly 180B with an image display to present images. As shown in FIG. 1A, the eyewear device 100 includes the right visible light camera 114B. Eyewear device 100 can include multiple visible light cameras 114A-B that form a passive type of depth-capturing camera, such as a stereo camera, of which the right visible light camera 114B is located on a right chunk 110B. The eyewear device 100 can also include a left visible light camera 114A on a left chunk 110A. Depth-capturing camera can be an active type of depth-capturing camera that includes a single visible light camera 114B and a depth sensor (e.g., an infrared camera and an infrared emitter).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640 p (e.g., 640×480 pixels for a total of 0.3 m 3egapixels), 720 p, or 1080 p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 312 of FIG. 3A) for digital processing along with a timestamp in which the image of the scene is captured. Image processor 312 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor 312 of FIG. 3A), depth images are generated, and the generated depth images can be perceived by a user on the optical assembly 180A-B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Figure 1B:
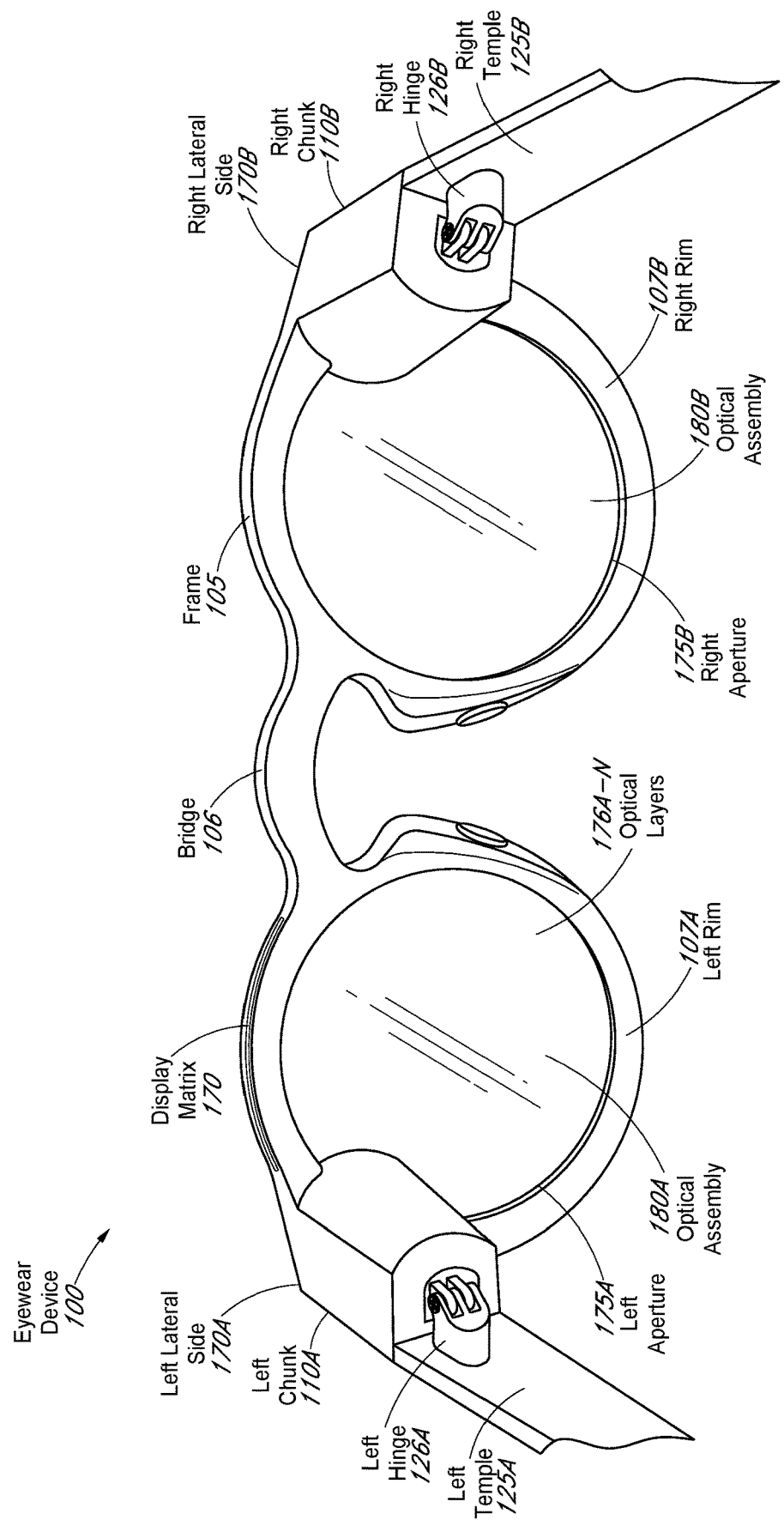
FIGS. 1B and 1C are rear views of example hardware configurations of the eyewear device, including two different types of image displays.
Figure 1C:
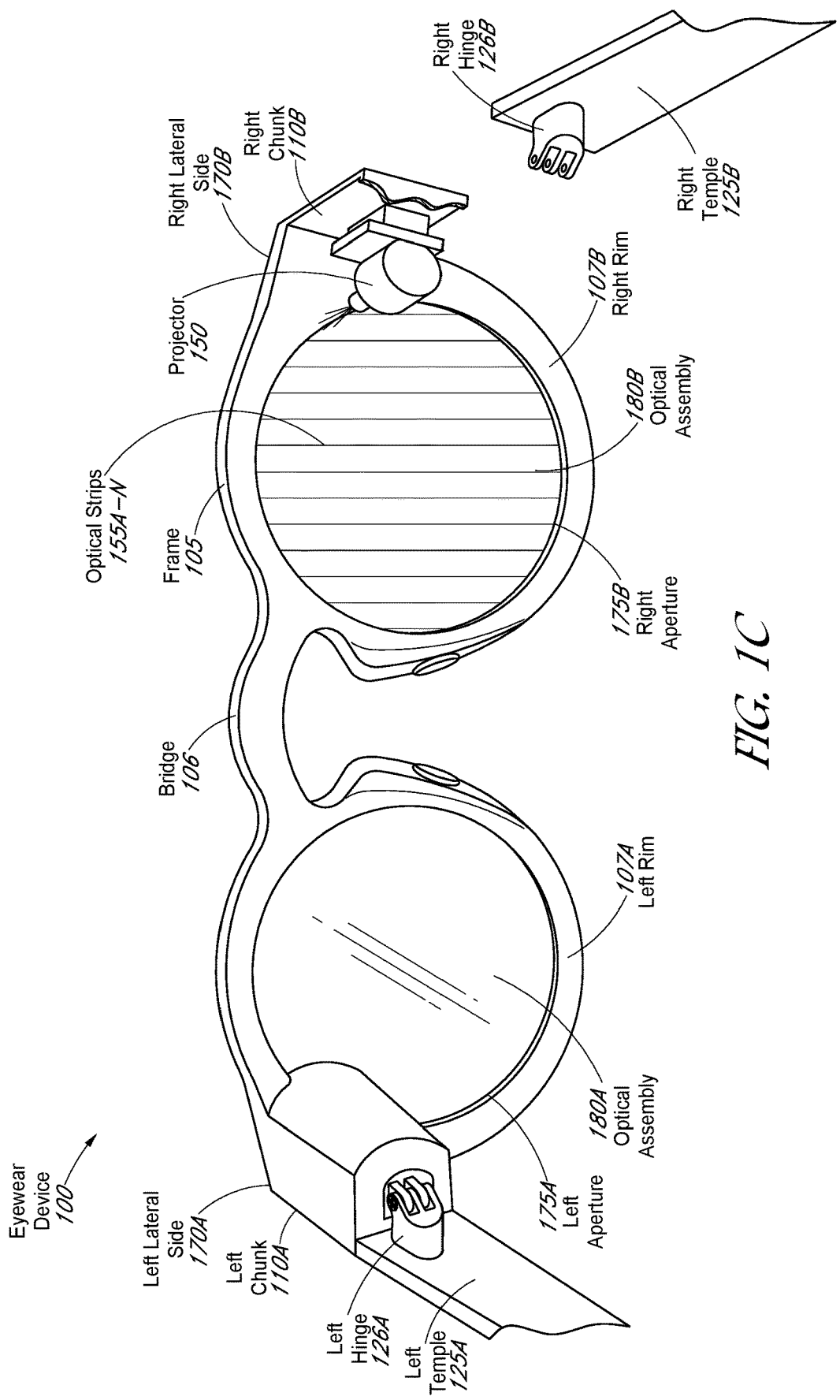

FIGS. 1B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface.

The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105. As used herein, the chunks 110A-B can include an enclosure that encloses a collection of processing units, camera, sensors, etc. (e.g., different for the right and left side) that are encompassed in an enclosure.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 1B; or optical strips 155A-N' and a projector 150A of FIG. 1C). The second optical assembly 180B includes the second image display e.g., a display matrix 170B of FIG. 1B; or optical strips 155A-N" and a projector 150B of FIG. 1C).

Figure 1D:
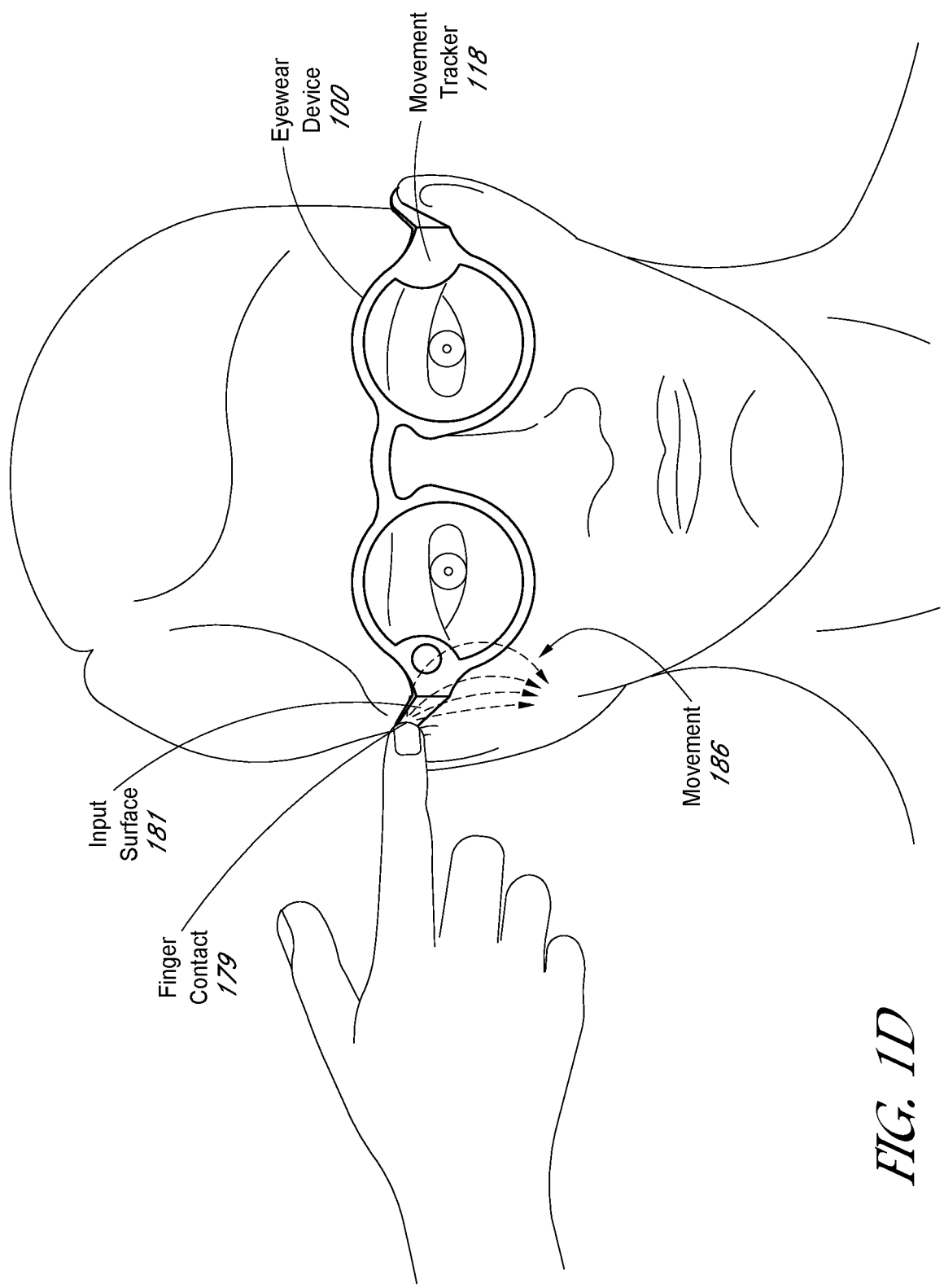
FIG. 1D depicts a schematic view of operation of the movement tracker of the eyewear device connected to an input surface to track movement of the eyewear device from at least one finger contact inputted from a user.

FIG. 1D depicts a schematic view of operation of a movement tracker of the eyewear device 100 connected to an input surface 181 to track movement of the eyewear device 100 from at least one finger contact 179 inputted from a user. The input surface 181 is formed of plastic, acetate, or another insulating material that forms a substrate of the frame 105, the temples 125A-B, or the lateral sides 170A-B.

While touch screens exist for mobile devices, such as tablets and smartphones, utilization of a touch screen in the lens of the eyewear device 100 can interfere with the line of sight of the user of the eyewear device 100 and hinder the user's view. For example, finger touches can smudge the optical assembly 180-B (e.g., optical layers, image display, and lens) and cloud or obstruct the user's vision. To avoid creating blurriness and poor clarity when the user's eyes look through the transparent portion of the optical assembly 180A-B, changes in rotational acceleration, motion, spatial orientation, and other measurement features collected by the movement tracker 118 resulting from finger contact on an input surface 181 can be utilized to detect finger touch gestures. Touch gestures are inputs to the human-machine interface of the eyewear device 100 to perform specific actions in applications executing on the eyewear device 100 or to navigate through displayed images in an intuitive manner, which enhances and simplifies the user experience.

When utilized in the neural network system, such a movement tracker 118 (which can be an inertial measurement unit, accelerometer, or gyroscope) that is already incorporated into the eyewear device 100 can save both costs of additional circuitry of a touch sensor (e.g., capacitive or resistive type touch sensors). Using measurements taken by the movement tracker 118 in a neural network model eliminates the additionally required space of incorporating a touch sensor circuit in the eyewear device 100, which reduces the form factor of the eyewear device 100. In addition, the savings here include cost. The system of neural network detection can be used with a touch sensor and movement tracker 118 (e.g., IMU). The benefit of neural networks in this context is their ability to recognize complex gestures and activities that are otherwise impossible to detect with handwritten heuristics based code.

Detection of finger gestures via the neural network model that uses measurement taken by the movement tracker 118 as a model input layer can enable several functions. For example, touching anywhere on the input surface 181 may highlight an item on the screen of the image display of the optical assembly 180A-B. Double tapping on the input surface 181 may select an item. Sliding (e.g., or swiping) a finger from front to back may slide or scroll in one direction, for example, to move to a previous video, image, page, or slide. Sliding the finger from back to front may slide or scroll in the opposite direction, for example, to move to a previous video, image, page, or slide. Pinching with two fingers may provide a zoom-in function to zoom in on content of a displayed image. Unpinching with two fingers provides a zoom-out function to zoom out of content of a displayed image. The input surface 181 can be virtually anywhere on the eyewear device 100. To detect finger sliding and pinching and unpinching a touch sensor incorporated in the eyewear device 100 may also be used with the movement tracker 118.

In one example, when the identified finger gesture is single tap on the input surface 181, this initiates selection or pressing of a graphical user interface element in the image presented on the image display of the optical assembly 180A-B. An adjustment to the image presented on the image display of the optical assembly 180A-B based on the identified finger gesture can be a primary action which selects or submits the graphical user interface element on the image display of the optical assembly 180A-B for further display or execution. This is just one example of a supported finger gesture, and it should be understood that several finger gesture types are supported by the eyewear device 100, which can include single or multiple finger contacts. Examples of multiple finger contact detected touch events and identified finger gestures are provided in FIGS. 6-9. Moreover, in some examples, the gesture may control other output components, such as a speakers of the eyewear device 100, e.g., controlling volume, for example.

Eyewear device 100 may include wireless network transceivers, for example cellular or local area network transceivers (e.g., WiFi or Bluetooth™), and run sophisticated applications. Some of the applications may include a web browser to navigate the Internet, an application to place phone calls, video or image codecs to watch videos or interact with pictures, codecs to listen to music, a turn-by-turn navigation application (e.g., to enter in a destination address and view maps), an augmented reality application, and an email application (e.g., to read and compose emails). Gestures inputted on the input surface 181 can be used to manipulate and interact with the displayed content on the image display and control the applications.

In an example, a neural network system includes the eyewear device 100. The eyewear device 100 includes a frame 105 and a left temple 125A extending from a left lateral side 170A of the frame 105 and a right temple 125B extending from a right lateral side 170B of the frame 105. Eyewear device 100 further includes an input surface 181 on the frame 105, the temples 110A-B, the lateral sides 170A-B, or a combination thereof. Eyewear device 100 further includes an image display to present an image to a user and an image display driver coupled to the image display to control the image presented to the user. Eyewear device 100 further includes a movement tracker 118 connected to the input surface 181 to track movement of the eyewear device 100 from at least one finger contact 179 inputted from a user. The movement tracker 118 includes: (i) at least one accelerometer to measure acceleration, (ii) at least one gyroscope to measure rotation, or (iii) an inertial measurement unit (IMU) having the at least one accelerometer and the at least one gyroscope.

Inertial measurement unit is an electronic device that measures and reports a body's specific force, angular rate, and sometimes the magnetic field surrounding the body, using a combination of accelerometers and gyroscopes, sometimes also magnetometers. If a magnetometer is present, the magnetic field can be used as input to the neural network to detect specific gestures that are dependent on Earth's or an artificial magnetic field. In this example, the inertial measurement unit determines a rotation acceleration of the eyewear device 100. The inertial measurement unit 972 works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The gyroscope detects the rate of rotation around 3 axes (X, Y, and Z). The magnetometer detects the magnetic field (e.g., facing south, north, etc.) like a compass which generates a heading reference, which is a mixture of Earth's magnetic field and other artificial magnetic field (such as ones generated by power lines). The three accelerometers detect acceleration along the horizontal (X), vertical (Y), and depth or distance (Z) axes defined above, which can be defined relative to the ground, the eyewear device 100, the depth-capturing camera, or the user wearing the eyewear device 100. Thus, the accelerometer detects a 3 axis acceleration vector, which then can be used to detect Earth's gravity vector Neural network system further includes a memory (element 334 of FIG. 3A), for example, in the eyewear device 100 itself or other components of the neural network system. Neural network system further includes a processor (element 332 of FIG. 3A) coupled to the image display driver (element 342 of FIG. 3A), the movement tracker 118, and the memory (element 334 of FIG. 3), for example, in the eyewear device 100 itself or other components of the neural network system.

Neural network system further includes programming (element 345 of FIG. 3A) in the memory and execution of the programming (element 345 of FIG. 3A) by the processor (element 343 of FIG. 3A) configures the eyewear device 100 to track, via the movement tracker 118, movement of the eyewear device 100 from the at least one finger contact 179 inputted from the user on the input surface 181. Tracking, via the movement tracker 118, includes: (i) measuring, via the at least one accelerometer, the acceleration of the eyewear device 100, (ii) measuring, via the at least one gyroscope, the rotation of the eyewear device 100, or (iii) measuring, via the inertial measurement unit, both the acceleration and the rotation of the eyewear device 100. Execution of the programming (element 345 of FIG. 3A) by the processor (element 332 of FIG. 3A) further configures the eyewear device 100 to identify a finger gesture on the input surface 181 of the eyewear device 100 by detecting at least one detected touch event based on variation of the tracked movement of the eyewear device 100 over a time period. Execution of the programming (element 345 of FIG. 3A) by the processor (element 332 of FIG. 3A) further configures the eyewear device 100 to adjust the image presented on the image display of the optical assembly 180A-B of the eyewear device 100 based on the identified finger gesture.

Other arrangements of the movement tracker 118 and input surface 181 can be implemented. In some arrangements, the input surface is on the left rim 107A or right rim 107B, or in different locations on the frame 105 or one or both of the chunks 110A-B or lateral sides 170A-B. The movement tracker 118 can be connected essentially anywhere on the frame 105, left chunk 110A, right chunk 110B, temples 125A-B, etc. to track movement 186 of the eyewear device 100, for example, resulting from finger contact 179.

Figure 2:
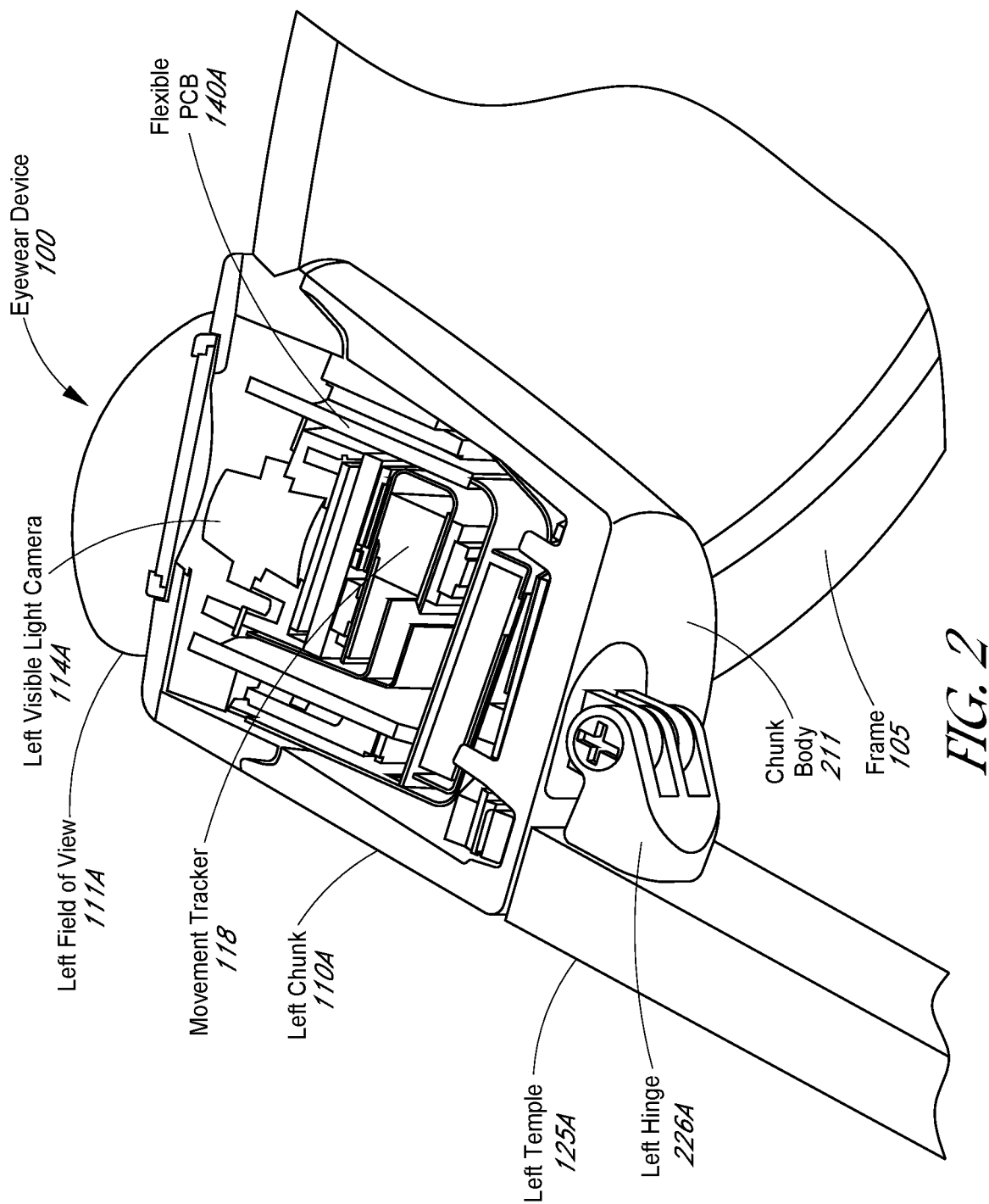
FIG. 2 is a top cross-sectional view of a left chunk of the eyewear device of FIGS. 1B and 1C depicting the movement tracker and a circuit board.

FIG. 2 is a top cross-sectional view of a left chunk 110A of the eyewear device 100 of FIGS. 1B and 1C depicting the movement tracker 118 and a circuit board 140A. In the example, the left chunk 110A includes a flexible printed circuit board 140A that includes the movement tracker 118. The left chunk 110A is integrated into or connected to the frame 105 on the left lateral side 170A. In some examples, the right chunk 110B may include the movement tracker 118 in a similar construction.

As described in FIGS. 3A-F and 4A-C below, the neural network system implemented in the gesture, wear, carry, or activity detection programming is made up of artificial neurons that have learnable weights and biases. These convolutional neural network (CNN) models are built via a host computer, such as the server system 398. The host computer may be a personal computer, embedded high speed processor, GPU, FPGA or any other system that performs neural network training. Server system 398 may be one or more computing devices as part of a service or network computing system, for example, that include a processor, a memory, and network communication interface to communicate over the network 395 with the mobile device 390 and eyewear device 100. It is not required for the server system 398 to communicate with the mobile device 399 or the eyewear device 100. The computing system that trains the neural network can be standalone and not specifically connected to any network. To have a high confidence level that the tracked movement over time period 360 is a recognized gesture or activity or that the device is being worn or carried, many (e.g., hundreds or thousands) of features, such as measurements 361A-N, 364A-N taken by the movement tracker 118 are inputted as the model input layer to the neural network model. However, to improve speed, memory footprint (both RAM and disk/flash storage), and efficiency, the gesture detection programming 345, wear/carry detection programming 386, or activity detection programming 302 may decide to short-circuit the procedure when, for example, 5-10 salient measurement features are matched instead of all one-hundred or one-thousand measurement features of the recognized gesture, activity, or wear/carry neural network models. Moreover, having a fast and low memory footprint neural network forward pass system enables the gesture detection programming 345, wear/carry detection programming 386, or activity detection programming 302 to execute and run on low power computational system 320, such as the one included in the eyewear device 100. Specifically, the trained neural network (forward pass) runs on the low power circuitry. Hence, although shown in the memory 334 of the high-speed circuitry 330, the neural network, such as gesture detection programming 345, wear/carry detection programming 386, or activity detection programming 302, can be stored and executed in the low power processor 323. The training itself is done offline as a one-time task on a server or computer, but really can be done on any high speed computing platform.

The basic unit of computation in a neural network is the neuron, often called a node or unit. The neuron receives input from some other nodes, or from an external source and computes an output. Each input has an associated weight (w), which is assigned on the basis of its relative importance to other inputs. The input layer provides information from the outside world to the neural network and consists of input nodes (e.g., tracked movement over time period 360 by the movement tracker 118). The hidden layer 348 (e.g., touch events 349A-N) has no direct connection with the outside world, but performs computations and transfers information from the input nodes to the output nodes. Output layer is responsible for computations and transferring information from the neural network to the outside world (e.g., identified finger gestures 369A-N and confidence levels 371A-N). The output layer is responsible for the final, classified network outputs. Classified outputs identify the gesture, such as a double tap. Further algorithms process this result into an action.

The neuron applies a function (f) to the weighted sum of its inputs. Each neuron receives some inputs, performs a dot product and optionally follows it with a non-linearity. The non-linearity here is the function f Output=f(sum(input(i) *weight(i))). Hence, the neural network is formed in three layers, called the input layer, hidden layer, and output layer. The function f is non-linear and is called the activation function. The purpose of the activation function is to introduce non-linearity into the output of a neuron. This is important because most real world data is non-linear and this allows the neurons to learn from these non-linear representations.

Every activation function (or non-linearity) takes a single number and performs a certain fixed mathematical operation on it. There are several activation functions encountered in practice: (i) sigmoid: takes a real-valued input and squashes it to range between 0 and 1; (ii) tanh: takes a real-valued input and squashes it to the range [−1, 1]; and (iii) ReLU (stands for Rectified Linear Unit), which takes a real-valued input and thresholds it at zero (replaces negative values with zero).

Figure 3A:
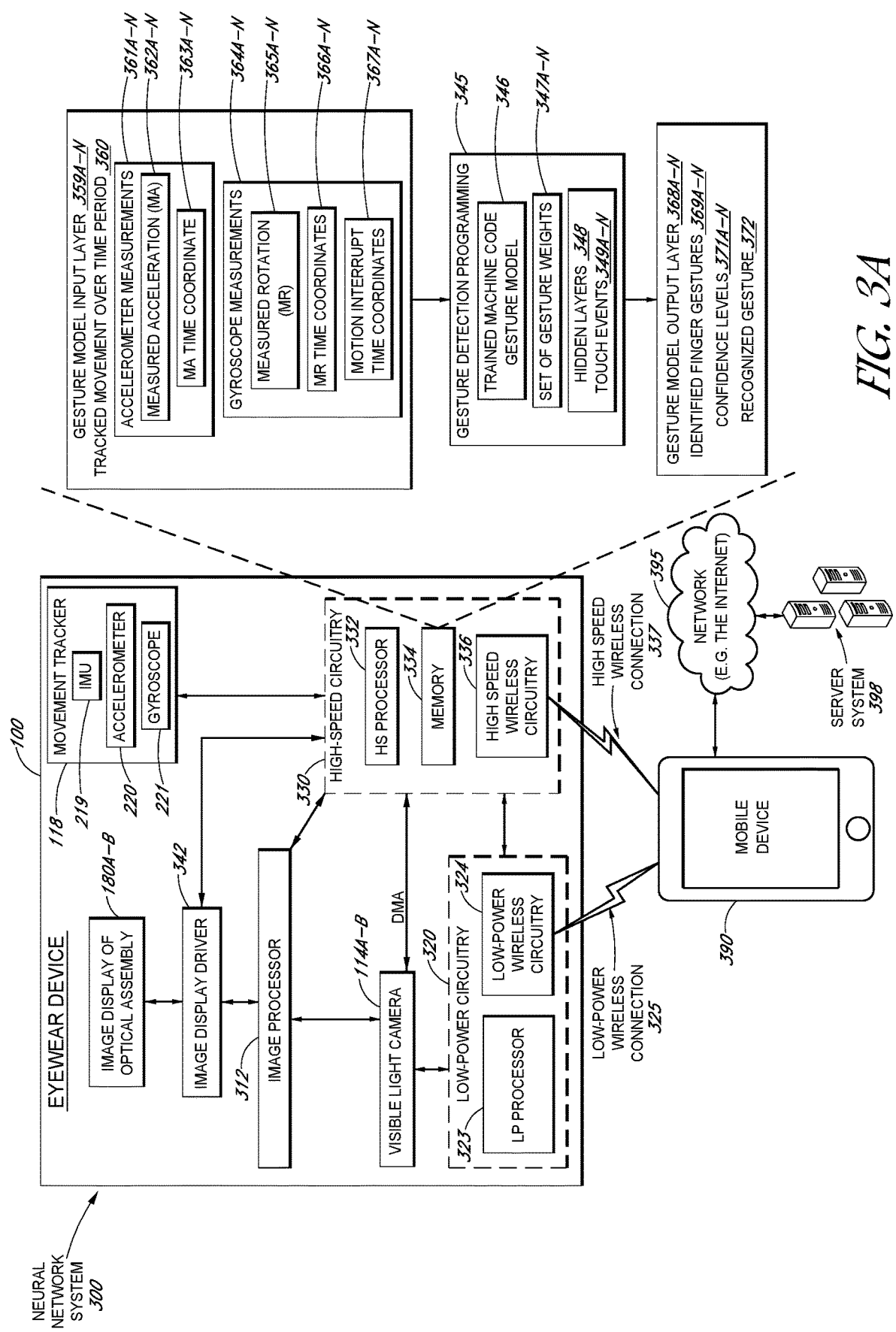
FIG. 3A is a high-level functional block diagram of an example neural network system including the eyewear device with the movement tracker to identify finger gestures based on a neural network model, a mobile device, and a server system connected via various networks.

FIG. 3A is a high-level functional block diagram of an example neural network system 300 including the eyewear device 100 with the movement tracker 118 to identify finger gestures based on a neural network model (gesture detection programming 345), a mobile device 390, and a server system 398 connected via various networks. Eyewear device 100 is connected with a host computer. For example, the eyewear device 100 is paired with the mobile device 390 via the high-speed wireless connection 337 or connected to the server system 398 via the network 395.

Figure 3B:
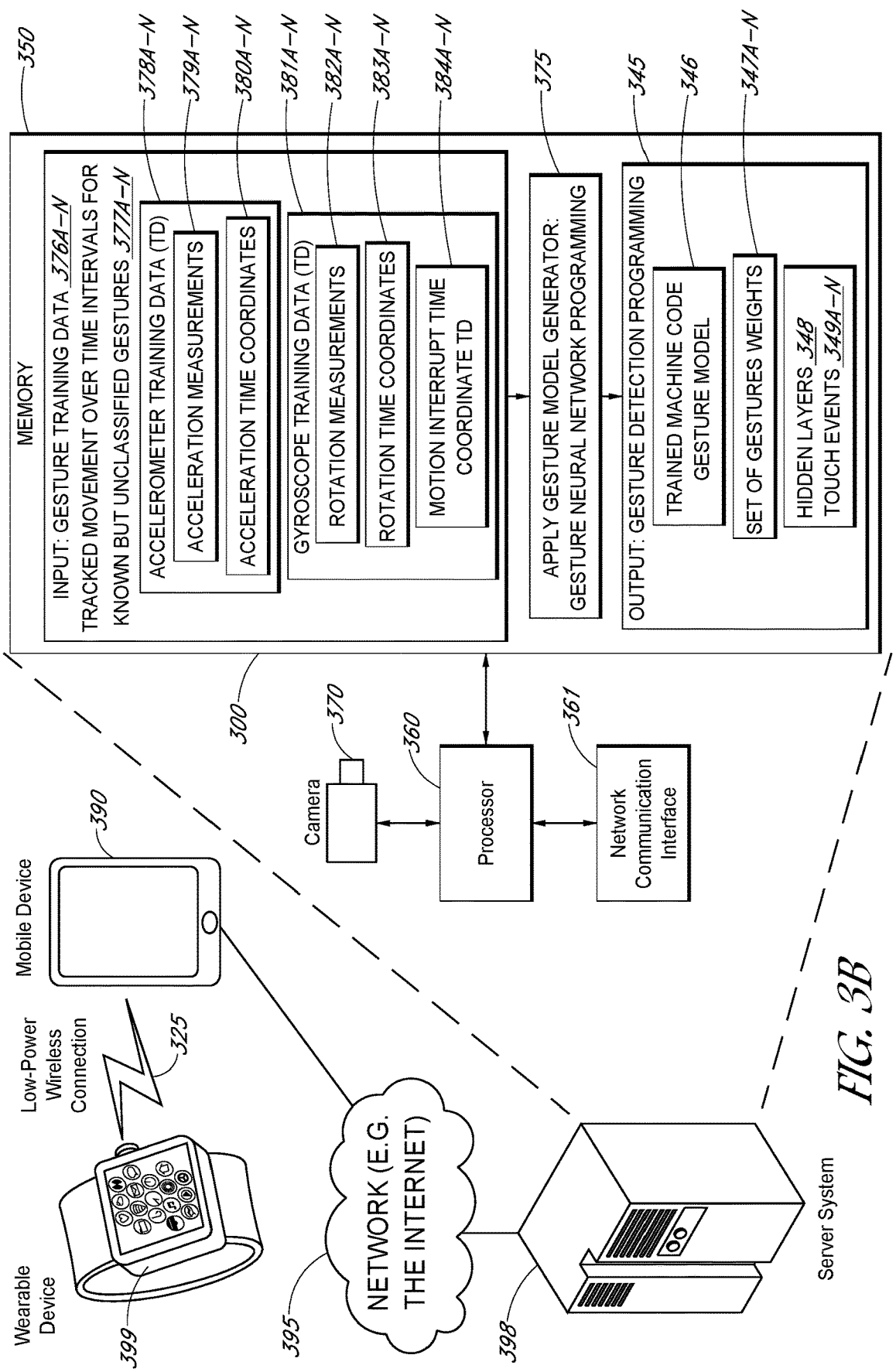
FIG. 3B shows an example of a hardware configuration for the server system of the neural network system of FIG. 3A to build a neural network model for identifying finger gestures, in simplified block diagram form.

Neural network system 300 includes a wearable device 399, which is the eyewear device 100 in the example of FIG. 3A. The wearable device 399 can also be a watch as shown in FIG. 3B, wristband, or other portable device designed to be worn by a user to communicate via one or more wireless networks or wireless links with mobile device 390 or server system 398. Mobile device 390 may be a smartphone, tablet, laptop computer, access point, or any other such device capable of connecting with eyewear device 100 using both a low-power wireless connection 325 and a high-speed wireless connection 337. Mobile device 390 is connected to server system 398 and network 395. The network 395 may include any combination of wired and wireless connections.

Eyewear device 100 includes the movement tracker 118 and a depth-capturing camera, such as at least one of the visible light cameras 114A-B; and a depth sensor (not shown, but comprising an infrared emitter and an infrared camera). Eyewear device 100 further includes two image displays of the optical assembly 180A-B (one associated with the left lateral side 170A and one associated with the right lateral side 170B). Eyewear device 100 also includes image display driver 342, image processor 312, low-power circuitry 320, and high-speed circuitry 330. Image display of optical assembly 180A-B is for presenting images and videos, which can include a sequence of images. Image display driver 342 is coupled to the image display of optical assembly 180A-B to control the image display of optical assembly 180A-B to present the images. The components shown in FIGS. 3A, 3C, and 3E for the eyewear device 100 are located on one or more circuit boards, for example a PCB or flexible PCB, in the rims 107A-B or temples 125A-B. Alternatively or additionally, the depicted components can be located in the chunks 110A-B, frame 105, hinges 226A-B, or bridge 106 of the eyewear device 100.

Generally, the neural network is pre-trained with labeled data set, then on the eyewear device 100, the neural network is executed through a forward-pass mechanism where the inputs 359A-N are presented and the trained weights are used to calculate the outputs 368A-N. The outputs represent the probabilities of each class of gesture or activity to be detected.

In the neural network system 300, eyewear device 100 includes a gesture model input layer 359A-N, which is tracked movement over time period 360 for the eyewear device 100. Tracked movement over time period 360 includes accelerometer measurements 361A-N, which includes measured acceleration (MA) 362A-N and measured acceleration time coordinates 363A-N to indicate when the measured acceleration 362A-N was taken. Tracked movement over time period 360 further includes gyroscope measurements 364A-N, which includes measured rotation (MR) 365A-N, measured rotation time coordinates 366A-N to indicate when the measured rotation 365A-N was taken, and motion interrupt time coordinates 367A-N (e.g., times when motion is detected).

As shown, memory 334 further includes gesture detection programming 345 to perform a subset or all of the functions described herein for gesture detection. Although the neural network model can include an input layer, hidden layers and output layer, in the example the neural network model of the gesture detection programming 345 includes convolutional layers (several), fully connected layers (these used to be hidden layers) and a single output layer. Gesture detection programming 345 has a trained machine code gesture model 346, a set of gesture weights 347A-N, and hidden layers 348 (which includes touch events 349A-N). Memory 334 further includes a gesture model output layer 368A-N. Gesture model output layer 368A-N has identified finger gestures 369A-N, confidence levels 371A-N for the identified finger gestures 369A-N, and a recognized gesture 372 that determines the most likely gesture of the identified finger gestures 369A-N.

High-speed circuitry 330 includes high-speed processor 332, memory 334, and high-speed wireless circuitry 936. In the example, the image display driver 342 is coupled to the high-speed circuitry 330 and operated by the high-speed processor 332 in order to drive the left and right image displays of the optical assembly 180A-B. High-speed processor 332 may be any processor capable of managing high-speed communications and operation of any general computing system needed for eyewear device 100. High-speed processor 332 includes processing resources needed for managing high-speed data transfers on high-speed wireless connection 337 to a wireless local area network (WLAN) using high-speed wireless circuitry 336. In certain embodiments, the high-speed processor 332 executes firmware that includes the gesture detection programming 345 and an operating system, such as a LINUX operating system or other such operating system of the eyewear device 100 and the operating system is stored in memory 334 for execution. In addition to any other responsibilities, the high-speed processor 332 executing a software architecture for the eyewear device 100 is used to manage data transfers with high-speed wireless circuitry 336. In certain embodiments, high-speed wireless circuitry 336 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes any storage device capable of storing various data and applications, including, among other things, gesture model input layer 359A-N, gesture detection programming 345, gesture model output layer 368A-N, camera data generated by the left and right visible light cameras 114A-B, and the image processor 312, as well as images and videos generated for display by the image display driver 342 on the image displays of the optical assembly 180A-B. While memory 334 is shown as integrated with high-speed circuitry 330, in other embodiments, memory 334 may be an independent standalone element of the eyewear device 100. In certain such embodiments, electrical routing lines may provide a connection through a chip that includes the high-speed processor 332 from the image processor 312 or low-power processor 322 to the memory 334. In other embodiments, the high-speed processor 332 may manage addressing of memory 334 such that the low-power processor 322 will boot the high-speed processor 332 any time that a read or write operation involving memory 334 is needed.

Figure 4A:
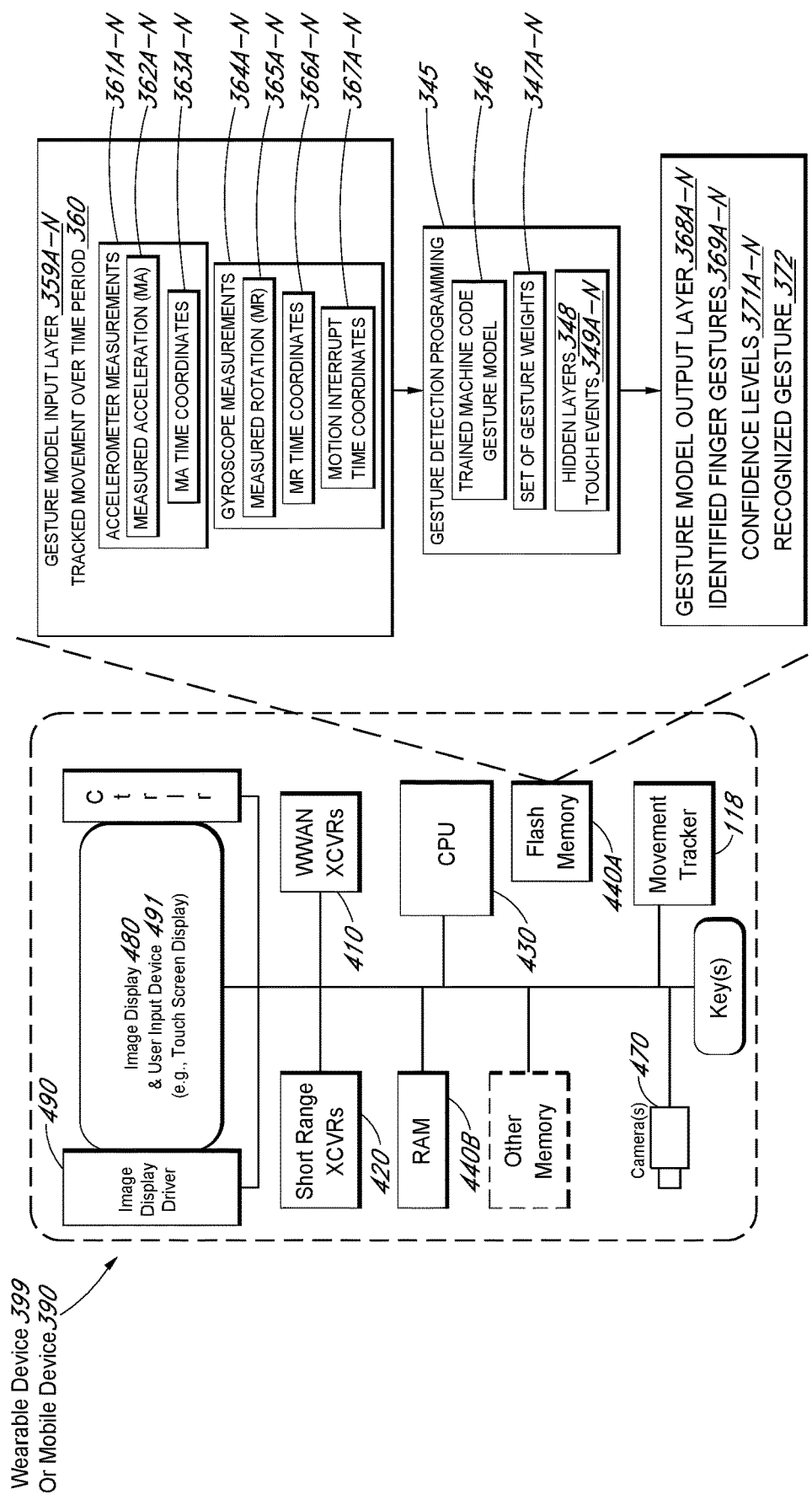
FIG. 4A shows an example of a hardware configuration for the wearable device or the mobile device of the neural network system of FIGS. 3A-B, which includes the movement tracker to identify finger gestures based on a neural network model.

As shown in FIG. 3A, the processor 332 of the eyewear device 100 can be coupled to the movement tracker 118, the depth-capturing camera (visible light cameras 114A-B; or visible light camera 114A and a depth sensor, which is not shown), the image display driver 342, and the memory 334. Eyewear device 100 can perform all or a subset of any of the following functions described below as a result of the execution of the gesture detection programming 345 in the memory 334 by the processor 332 of the eyewear device 100. As shown in FIG. 4A, mobile device 390 can perform all or a subset of any of the following functions described below as a result of the execution of the gesture detection programming 345 in the memory 440A by the processor 430 of the mobile device 390.

In the example of FIG. 3A, execution of the gesture detection programming 345 by the processor 332 configures the eyewear device 100 to perform functions, including functions to track, via the movement tracker 118, movement of the eyewear device 100 from the at least one finger contact 179 inputted from the user on the input surface 181 by: (i) measuring, via the at least one accelerometer, the acceleration 362A-N of the eyewear device 100, (ii) measuring, via the at least one gyroscope, the rotation 365A-N of the eyewear device 100, or (iii) measuring, via the inertial measurement unit, both the acceleration 362A-N and the rotation 365A-N of the eyewear device 100. Eyewear device 100 identifies a finger gesture 369A-N on the input surface 181 of the eyewear device by detecting at least one detected touch event 349A-N based on variation of the tracked movement of the eyewear device 100 over a time period 360. Eyewear device 100 adjusts the image presented on the image display 180A-B of the eyewear device 100 based on the identified finger gesture 369A-N.

Movement tracker 118 is further configured to track over the time period a respective time coordinate 363A-N, 366A-N, 367A-N for each taken measurement of: (i) the measured acceleration 362A-N via the accelerometer, (ii) the measured rotation 365A-N via the least one gyroscope, or (iii) both the measured acceleration 362A-N and the rotation 365A-N via the inertial measurement unit. Eyewear device 100 tracks, via the movement tracker 118, the respective time coordinate 363A-N, 366A-N, 367A-N for each taken measurement 362A-N, 365A-N. The function to detect the at least one touch event 349A-N based on the variation of the tracked movement over the time period 360 is further based on the respective time coordinate 363A-N, 366A-N, 367A-N for each taken measurement 362A-N, 365A-N.

The function to identify the finger gesture on the input surface 181 of the eyewear device 100 by detecting the at least one detected touch event 349A-N based on variation of the tracked movement 360 of the eyewear device 100 over the time period includes the following functions. First, applying multiple model inputs 359A-N that include taken measurements of: (i) the measured acceleration 362A-N via the accelerometer, (ii) the measured rotation 365A-N via the least one gyroscope, or (iii) both the measured acceleration 362A-N and the rotation 365A-N via the inertial measurement unit taken at sampling frequency during the time period 360 to a recognized gesture model 346 to determine similarity of the variation of the tracked movement 360 to a recognized gesture in the recognized gesture model 346. The recognized gesture model 346 includes a set of gesture weights 347A-N based on acquired training data 376A-N of: (i) acceleration 378A-N, (ii) rotation 381A-N or (iii) both the acceleration 378A-N and the rotation 381A-N over one or more time intervals. Second, determining a model output 368A-N that includes a respective confidence level 371A-N of each respective recognized gesture 369A-N based on the determined similarity of the variation of the tracked movement 360 to the respective recognized gesture 369A-N. The neural network is pre-trained with labeled data set, then on the eyewear device 100, the neural network (e.g., gesture detection programming 345) is executed through a forward-pass mechanism (e.g., trained machine code gesture model 346) where the inputs 359A-N are presented and the trained weights (set of gesture weights 347A-N) are used to calculate the outputs 368A-N. The outputs 368A-N represent the probabilities of each class of gesture to be detected.

The function to apply the multiple model inputs 359A-N to determine similarity of the variation of the tracked movement 360 to the recognized gesture in the recognized gesture model 346 and determine the model output 368A-N are embedded as firmware programming in the eyewear device 100. The function to identify the finger gesture on the input surface 181 of the eyewear device 100 by detecting the at least one detected touch event 349A-N based on variation of the tracked movement 360 of the eyewear device 100 over the time period further includes identifying the recognized gesture 372 as the respective recognized gesture 369A-N that has the respective confidence level 371A-N with a highest value in the model output 368A-N. The function to identify the recognized gesture as the respective recognized gesture 369A-N that has the respective confidence level 369A-N with the highest value in the model output 368A-N is application layer programming in the eyewear device 100.

Output components of the eyewear device 100 include visual components, such as the left and right image displays of optical assembly 180A-B as described in FIGS. 1B-C (e.g., a display such as a liquid crystal display (LCD), a plasma display panel (PDP), a light emitting diode (LED) display, a projector, or a waveguide). Left and right image displays of optical assembly 180A-B can present images, such as in a video. The image displays of the optical assembly 180A-B are driven by the image display driver 342. The output components of the eyewear device 100 further include acoustic components (e.g., speakers), haptic components (e.g., a vibratory motor), other signal generators, and so forth. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

FIG. 3B shows an example of a hardware configuration for the server system 398 of the neural network system 300 of FIG. 3A to build a neural network model for identifying finger gestures (gesture detection programming 345), in simplified block diagram form. As further shown in FIG. 3B, server system 398 may be one or more computing devices as part of a service or network computing system, for example, that include a memory 350, a processor 360, a network communication interface 361 to communicate over the network 395 with the mobile device 390 and a wearable device 399, such as the eyewear device 100. The memory 350 includes gesture training data (TD) 376A-N, which includes tracked movement over time intervals for known but unclassified gestures 377A-N. Gesture training data 376A-N includes accelerometer training data (TD) 378A-N. Accelerometer training data 378A-N has acceleration measurements 379A-N and acceleration time coordinates 380A-N to indicate when the acceleration measurement 379A-N was taken. Gesture training data 376A-N includes gyroscope training data 381A-N. Gyroscope training data 381A-N has rotation measurements 382A-N and rotation time coordinates 383A-N to indicate when the rotation measurement 382A-N was taken. Gesture training data 376A-N also includes motion interrupt time coordinates 384A-N (e.g., times when motion is detected).

Memory 350 also includes a gesture model generator, shown as gesture neural network programming 375. Memory 350 also includes gesture detection programming 345 which is outputted in response to applying the gesture neural network programming 375 to the inputted gesture training data 376A-N. As shown, the gesture detection programming 345 includes a trained machine code gesture model 346, a set of gesture weights 347A-N, and hidden layers 348, such as touch events 349A-N. The built gesture detection programming 345 is loaded in the eyewear device 100 or wearable device 399 for gesture detection.

Execution of the gesture neural network programming 375 by the processor 360 configures the server system 398 to perform some or all of the functions described herein before execution of the gesture detection programming 345 by the processor 332 of the eyewear device 100. First, acquire the training data 376A-N of: (i) acceleration 378A-N, (ii) rotation 381A-N, or (iii) both the acceleration 376A-N and the rotation 381A-N of the eyewear device 100 over one or more time intervals for the known, but unclassified gesture 377A-N. Second, build the recognized gesture model 346 of the unclassified gesture based on the acquired training data 376A-N. The function to build the recognized gesture model 346 includes functions to calibrate the set of gesture weights 347A-N from the acquired training data 376A-N of the unclassified gesture; and store the calibrated set of gesture weights 347A-N in the recognized gesture model 346 in association with the recognized gesture.

Gesture neural network programming 375 generates a trained model based on training data. Training data is user-labeled inputs and outputs that are used to calculate the weights of the neural network. The scripting language here may be irrelevant, as this can be done in many languages or in hardware. To improve runtime efficiency of the built gesture detection programming 345, gesture neural network programming 375 may implement the following functions. Generate a trained scripting language gesture model in an interpreted programming language based on the acquired training data 376A-N of the unclassified gesture 377A-N. Extract the calibrated set of gesture weights 347A-N from the trained scripting language gesture model. Generate a trained inferencing code gesture model in a compiled programming language based on the trained scripting language gesture model. Compile the trained inferencing code gesture model into a trained machine inferencing code gesture model 346. Quantize the extracted calibrated set of gesture weights 347A-N.

A runtime efficient version of the gesture detection programming 345 can be stored in the memory 334 of the eyewear device 100 includes the trained inferencing machine code gesture model 346 and the quantized calibrated set of gesture weights 347A-N. To further improve runtime, the gesture detection programming 345 only occupies statically allocated memory during runtime.

Figure 3C:
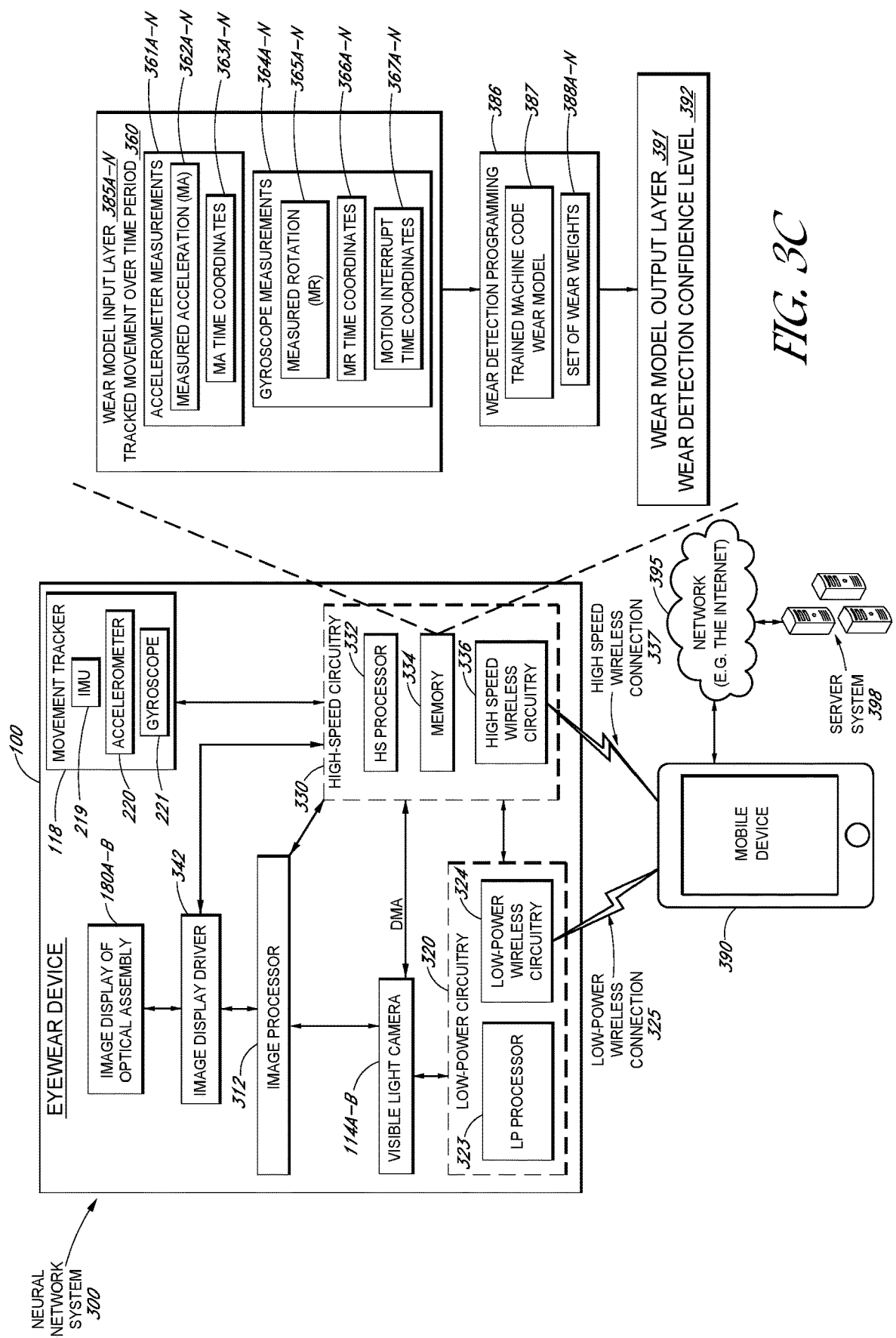
FIG. 3C is a high-level functional block diagram of an example neural network system including the eyewear device with the movement tracker to detect wear based on a neural network model, a mobile device, and a server system connected via various networks.

FIG. 3C is a high-level functional block diagram of an example neural network system 300 including the eyewear device 100 with the movement tracker 118 to detect wear based on a neural network model (wear detection programming 386), a mobile device 390, and a server system 398 connected via various networks. Because the components of FIG. 3C were already explained in detail in FIG. 3A, repetition of some of the details is avoided here.

In the neural network system 300, the memory 334 of the eyewear device 100 includes a wear model input layer 385A-N, which is the tracked movement over time period 360 as described in FIG. 3A. As shown, memory 334 further includes wear detection programming 386. The wear detection programming 386 has a trained machine code wear model 387 and a set of wear weights 388A-N. Memory 334 further includes a wear model output layer 391. The wear model output layer 391 can be a single output value that is a wear detection confidence level 392, which is a probability value that ranges from zero to 1 of being worn. The not being worn confidence level is 100 percent minus the wear detection confidence level. Code outside of the neural network thresholds this value, typically at 0.5 to come up with a binary classification.

Execution of the wear detection programming 386 by the processor 332 configures the eyewear device 100 to perform the following functions. Track, via the movement tracker 118, movement of the eyewear device 100 from the at least one finger contact 179 inputted from the user on the input surface 181 by: (i) measuring, via the at least one accelerometer, the acceleration 362A-N of the eyewear device 100, (ii) measuring, via the at least one gyroscope, the rotation 365A-N of the eyewear device 100, or (iii) measuring, via the inertial measurement unit, both the acceleration 362A-N and the rotation 365A-N of the eyewear device 100. Detect whether the user is wearing the eyewear device 100 based on variation of the tracked movement of the eyewear device over a time period 360.

Figure 3D:
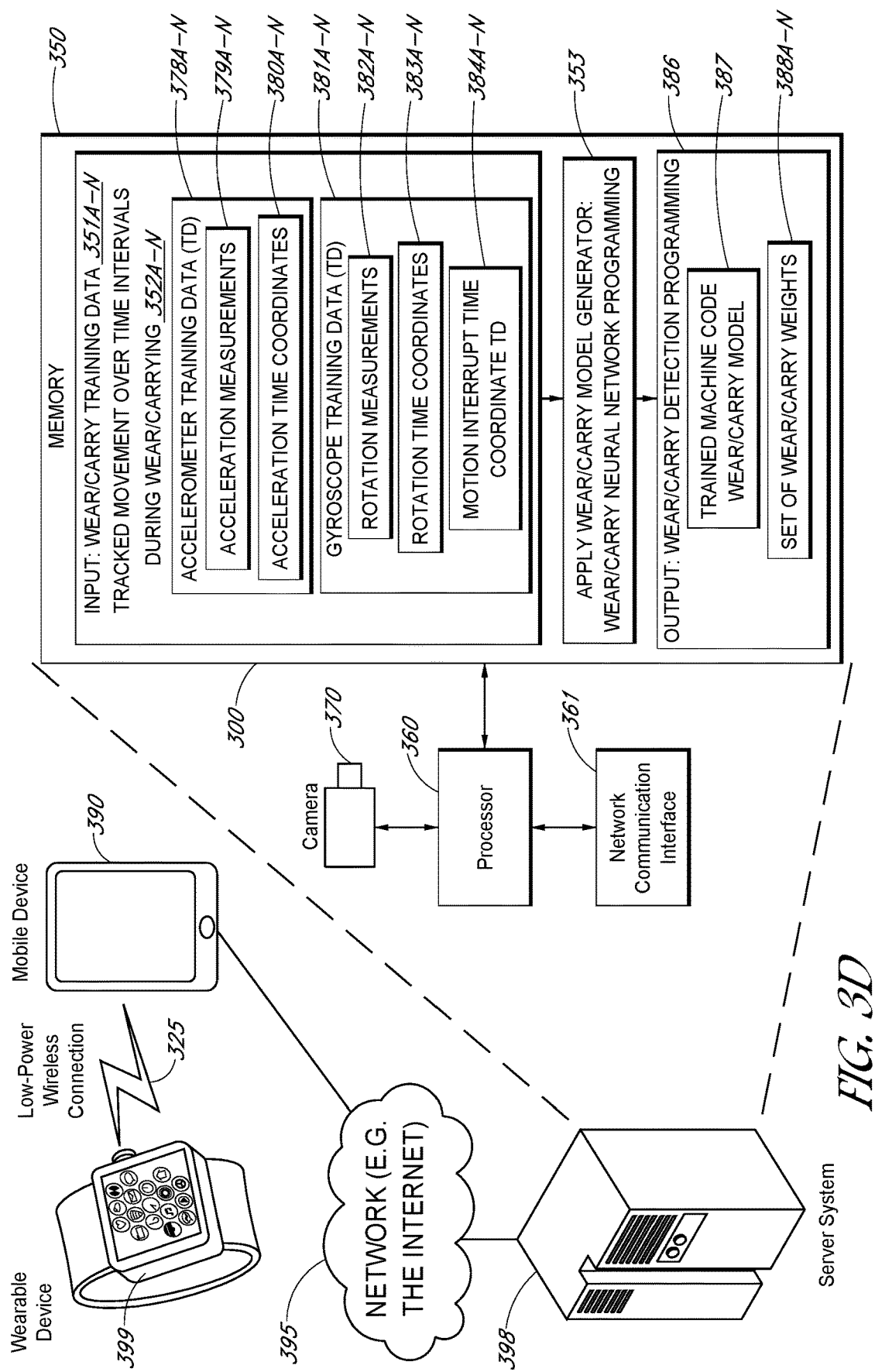
FIG. 3D shows an example of a hardware configuration for the server system of the neural network system of FIG. 3B to build a neural network model for wear detection, in simplified block diagram form.

FIG. 3D shows an example of a hardware configuration for the server system 398 of the neural network system of FIG. 3B to build a neural network model for wear detection. Because the components of FIG. 3D were already explained in detail in FIG. 3B, repetition of some of the details is avoided here. In addition to detecting wear of a wearable device 399, such as the eyewear device 100, the methodology described herein can be used to enable carry detection of the mobile device 390 (e.g., determine when the user is walking with the device in his/her hand, on their person, or in a backpack or purse). The wear detection system can be expanded to activities such as distinguishing between standing, walking, running with the device worn for example. It can be used to detect gaze or attention to a specific object (with the help of the magnetometer).

As further shown in FIG. 3D, memory 350 of server system 398 includes wear/carry training data (TD) 351A-N. Wear/carry training data (TD) 351A-N has tracked movement over time intervals during wearing/carrying 352A-N of the wearable device 399 (e.g., eyewear device 100) or the mobile deice 390. Wear/carry training data 351A-N includes accelerometer training data (TD) 378A-N, which has acceleration measurements 379A-N and acceleration time coordinates 380A-N to indicate when the acceleration measurement 379A-N was taken. Wear training data 351A-N includes gyroscope training data 381A-N, which includes rotation measurements 382A-N and rotation time coordinates 383A-N to indicate when the rotation measurement 382A-N was taken. Wear training data 351A-N also includes motion interrupt time coordinates 384A-N (e.g., times when motion is detected).

Memory 350 also includes a wear/carry model generator, shown as wear/carry neural network programming 353. Memory 350 also includes wear/carry detection programming 386, which is outputted in response to applying the wear/carry neural network programming 353 to the inputted wear/carry training data 351A-N. As shown, the wear/carry detection programming 386 includes a trained machine code wear/carry model 387 and a set of wear/carry weights 388A-N. As used herein, the "trained machine code" is the inferencing code (e.g., written in C language and then compiled into machine code to execute on the microcontroller) to run on a forward pass on a "model," where the model includes a table of neural network weights. In this case the "model" is the set of wear/carry weights 388A-N. The "trained machine code model" (inferencing code) is the trained machine code wear/carry model 387. The built wear/carry detection programming 386 is loaded in the wearable device 399 (e.g., eyewear device) for wear detection or mobile device 390 for carry detection.

In the wear detection example, execution of the wear neural network programming 353 by the processor 360 configures the server system 398 to perform some or all of the functions described herein before execution of the wear detection programming 386 by the processor 332 of the eyewear device 100. First, acquire the training data 351A-N of: (i) acceleration 378A-N, (ii) rotation 381A-N, or (iii) both the acceleration 378A-N and the rotation 381A-N of the eyewear device 100 over one or more time intervals during wearing of the eyewear device 100 and when the eyewear device 100 is not being worn. Second, build the recognized wear model 387 based on the acquired training data 351A-N. The function to build the recognized wear model 387 includes calibrating the set of wear weights 388A-N from the acquired training data 351A-N during wearing of the eyewear device 100 and when the eyewear device 100 is not being worn; and storing the calibrated set of wear weights 388A-N (e.g., trained set or optimized set) in the recognized wear model 387 in association with a classification of the eyewear device 100 as being worn or unworn.

Figure 3E:
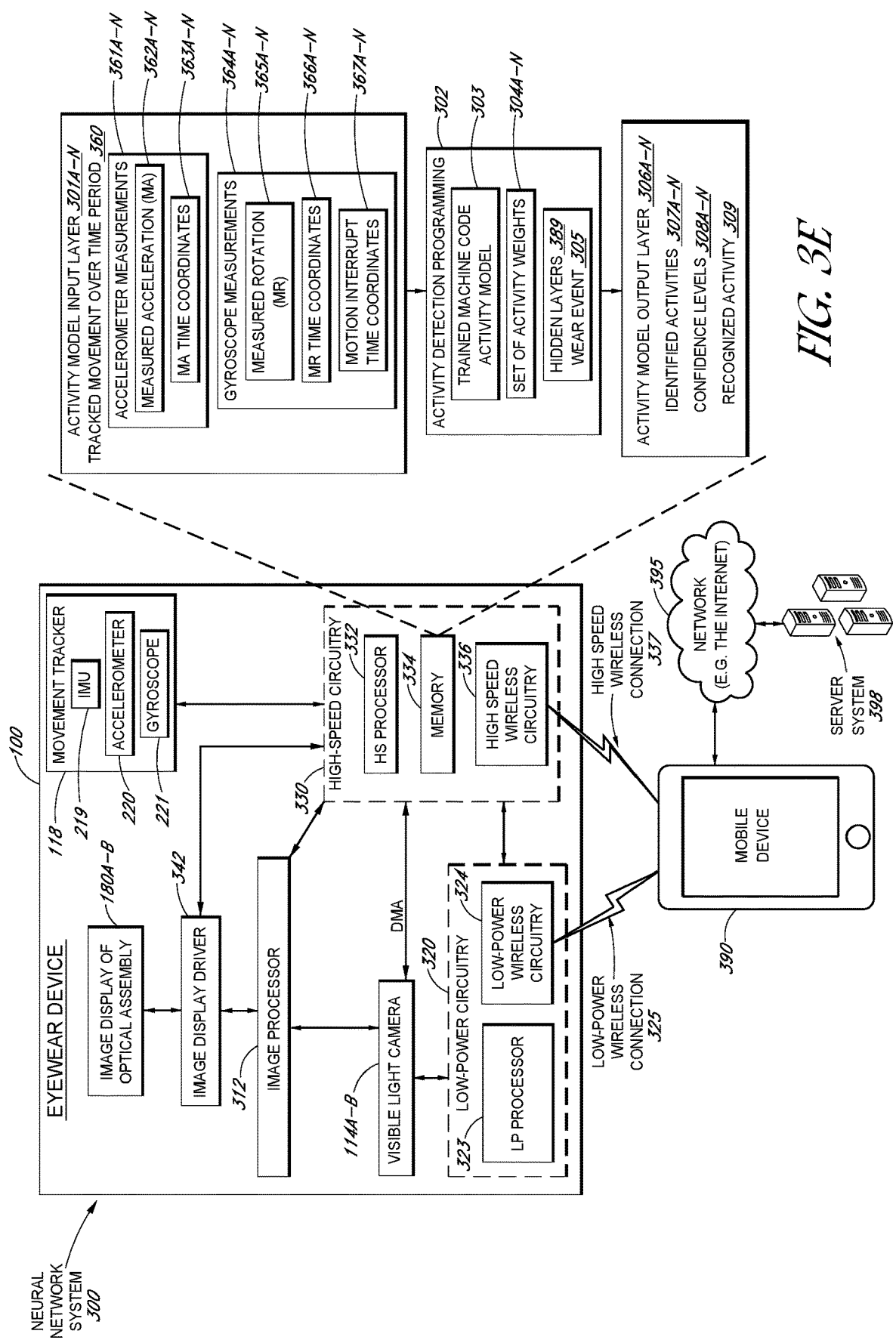
FIG. 3E is a high-level functional block diagram of an example neural network system including the eyewear device with the movement tracker to identify activities based on a neural network model during wearing of the eyewear device, a mobile device, and a server system connected via various networks.

FIG. 3E is a high-level functional block diagram of an example neural network system including the eyewear device 100 with the movement tracker to identify activities based on a neural network model (activity detection programming 302) during wearing of the eyewear device 100, a mobile device 390, and a server system 398 connected via various networks. Because the components of FIG. 3E were already explained in detail in FIG. 3A, repetition of some of the details is avoided here.

In the neural network system 300, eyewear device 100 includes an activity model input layer 301A-N, which is tracked movement over time period 360. Tracked movement over time period 360 includes accelerometer measurements 361A-N, which has measured acceleration (MA) 362A-N and measured acceleration time coordinates 363A-N to indicate when the measured acceleration 362A-N was taken. Tracked movement over time period 360 further includes gyroscope measurements 364A-N, which includes measured rotation (MR) 365A-N, measured rotation time coordinates 366A-N to indicate when the measured rotation 365A-N was taken, and motion interrupt time coordinates 367A-N (e.g., times when motion is detected). Memory 334 further includes an activity model output layer 306A-N, which includes identified activities 307A-N, confidence levels 308A-N for the identified activities 307A-N, and a recognized activity 309 that determines the most likely activity of the identified activities 307A-N.

As shown, memory 334 further includes activity detection programming 302. Activity detection programming 302 includes a trained machine code activity model 303, a set of activity weights 347A-N, and hidden layers 389 (which includes wear event 305). Execution of the activity detection programming 302 by the processor configures the eyewear device 100 to perform the following functions. In response to detecting that the user is wearing the eyewear device 100 as described in FIG. 3C, identify a recognized activity 309 of the user wearing the eyewear device 100 based on the variation of the tracked movement over the time period 360. Adjust an image presented on the image display 180A-B of the eyewear device 100 based on a recognized activity-based adjustment of the recognized activity 309. The recognized activity-based adjustment includes launch, hide, or display (e.g., opening) of an application for the user to interact with or utilize. The recognized activity-based adjustment includes display of a menu of applications related to the recognized object for execution (e.g., a hint). The recognized activity-based adjustment includes control of a contextual notification to enable, disable, or restrict features of an application. The recognized activity-based adjustment includes enable or disable of a system level feature (e.g., power on or power off device peripherals, such as cameras 114A-B). The recognized activity-based adjustment may include a combination of the foregoing.

Figure 3F:
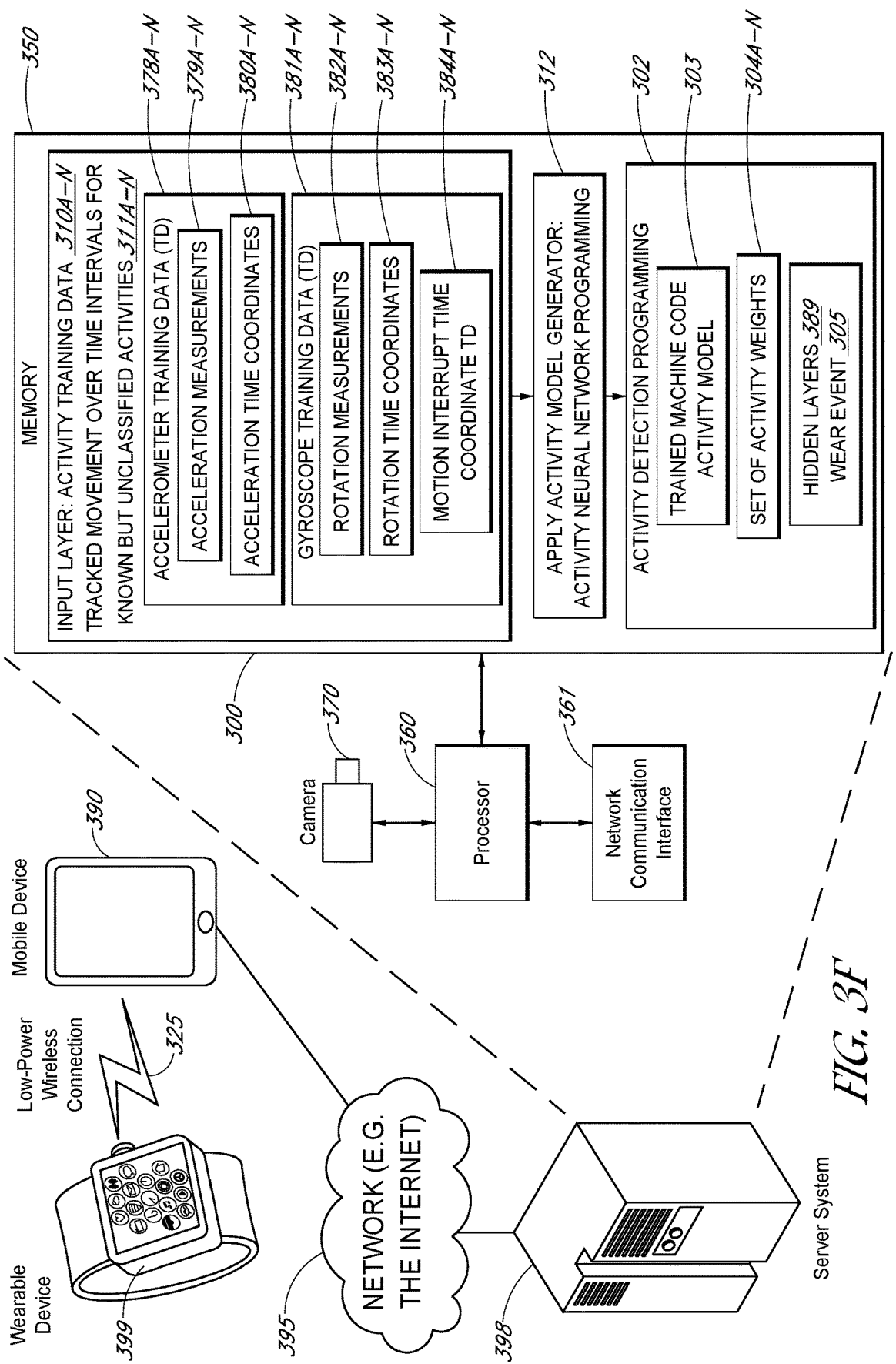
FIG. 3F shows an example of a hardware configuration for the server system of the neural network system of FIG. 3E to build a neural network model for identifying activities during wearing of the eyewear device, in simplified block diagram form.

FIG. 3F shows an example of a hardware configuration for the server system of the neural network system 300 of FIG. 3E to build a neural network model for identifying activities during wearing of the eyewear device (activity detection programming 302), in simplified block diagram form. The memory 350 includes activity training data (TD) 310A-N, which includes tracked movement over time intervals for known but unclassified activities 311A-N. Activity training data 310A-N includes accelerometer training data (TD) 378A-N, which has acceleration measurements 379A-N and acceleration time coordinates 380A-N to indicate when the acceleration measurement 379A-N was taken. Gesture training data 376A-N includes gyroscope training data 381A-N, which includes rotation measurements 382A-N and rotation time coordinates 383A-N to indicate when the rotation measurement 382A-N was taken. Gesture training data 376A-N also includes motion interrupt time coordinates 384A-N (e.g., times when motion is detected).

Memory 350 also includes an activity model generator, shown as activity neural network programming 312. Memory 350 also includes activity detection programming 302 which is outputted in response to applying the activity neural network programming 312 to the inputted activity training data 310A-N. As shown, the activity detection programming 302 includes a trained machine code activity model 303, a set of activity weights 304A-N, and hidden layers 389, such as a wear event 305. The built activity detection programming 302 is loaded in the wearable device 399 (e.g., eyewear device 100) or the mobile device 390 for activity detection.

Execution of the activity neural network programming 312 by the processor 360 configures the server system 398 to perform various functions before execution of the activity detection programming 302 by the processor 332 of the eyewear device 100. First, server system 398 acquires the training data 310A-N of: (i) acceleration 378A-N, (ii) rotation 381A-N, or (iii) both the acceleration 378A-N and the rotation 381A-N of the eyewear device 100 over one or more time intervals of the unclassified activity 311A-N. Second, server system 398 builds the recognized activity model 303 of the unclassified activity based on the acquired training data 310A-N. Building the recognized activity model 303 includes calibrating the set of activity weights 304A-N of the unclassified activity from the acquired training data 310A-N of the unclassified activity 311A-N. Building the recognized activity model 303 further includes storing the calibrated set of activity weights 304A-N in the recognized activity model 303 in association with the recognized activity.

As described in FIGS. 3A-C, gesture detection programming 345, wear/carry detection programming 386, or activity detection programming 302 of the eyewear device 100 is stored locally in a read-only memory (ROM), erasable programmable read-only memory (EPROM), or flash memory of high-speed circuitry 330. A firmware layer of the gesture detection programming 345, wear/carry detection programming 386, or activity detection programming 302 returns a keyword corresponding to the recognized gesture or activity and a confidence level that the tracked movement over time period 360 corresponds to the gesture or activity to the application layer of the gesture detection programming 345, wear/carry detection programming 386, or activity detection programming 302. The neural network returns a number of probabilities, one for each activity to be recognized. Typically choosing the max probability beyond some threshold (typically 0.5) is how the final result (activity) is determined. Firmware resides below the operating system level and is more efficient, which optimizes speed of execution by calling the hardware directly, for example. An application layer of the gesture detection programming 345, wear/carry detection programming 386, or activity detection programming 302 determines a recognized-gesture or activity based adjustment to take depending on the recognized activity or gesture, and confidence level. Having the recognized-gesture or activity based adjustment determination reside in the application layer allows dynamic changes to be made with updates distributed from the server system 398 via the networks 395, 337.

In some examples in which runtime is not deemed important, to allow for propagated updates to the gesture detection programming 345, wear/carry detection programming 386, or activity detection programming 302, firmware is not utilized for gesture, wear/carry, or activity detection and the entire logic of the resides in the application layer in volatile type memory 334. This can enable updates, which are transmitted from the server system 398 via the networks 395, 337. For example, the server system 398 receives, via the network communication interface 361, crowdsourced additional training data 376A-N, 351A-N, 359A-N from the same type of wearable device 399 or mobile device 390 of a different user. Server system 398 updates the recognized object model 366 of the recognized object based on the crowdsourced additional training data 376A-N, 351A-N, 310A-N from the same type of wearable device 399 (e.g., eyewear device) or same mobile device 390, but from different users. Updating the gesture detection programming 345, wear/carry detection programming 386, or activity detection programming 302 includes reapplying the model generator to rebuild the gesture detection programming 345, wear/carry detection programming 386, or activity detection programming 302. Re-training is done offline on a high speed computing device. The result is a set of calculated weights which can be transmitted to the eyewear to update the neural network. Typically, this is called an over-the-air (OTA) update and can include other software. Another mechanism for updating is one that is done in the background without user intervention. Server system 398 then sends, via the network 395, gesture detection programming 345, wear/carry detection programming 386, or activity detection programming 302 to the wearable device 399 (e.g., eyewear device) or the mobile device 390

FIG. 4A shows an example of a hardware configuration for the wearable device 399 or the mobile device 390 of the neural network system of FIGS. 3A-B, which includes the movement tracker 118 to identify finger gestures based on a neural network model (gesture detection programming 345). As shown in FIG. 4A, the gesture detection programming 345 implemented in the wearable device 399 or mobile device 390 for gesture detection is identical to that shown in FIG. 3A for the eyewear device 100. The gesture neural network programming 375 of FIG. 3B trains the gesture detection programming 345 for the wearable device 399 and the mobile device 390 in the exact same manner as the eyewear device 100. However, because the gesture training data 376A-N and the gesture model input layer 359A-N varies on the type and value of taken measurements on the movement tracker 118, as well as the form factor of the eyewear device 100, wearable device 399, and the mobile device 390, the set of gesture weights 347A-N and trained machine code gesture model 346 may vary device to device. As a result, the gesture detection programming 345 may be device specific. In some examples, the IMU location and transforms can be re-applied to another similar device and the same neural network can be used. The accuracy will not be as good, but in this case only a shorter/smaller re-training pass needs to be done.

Figure 4B:
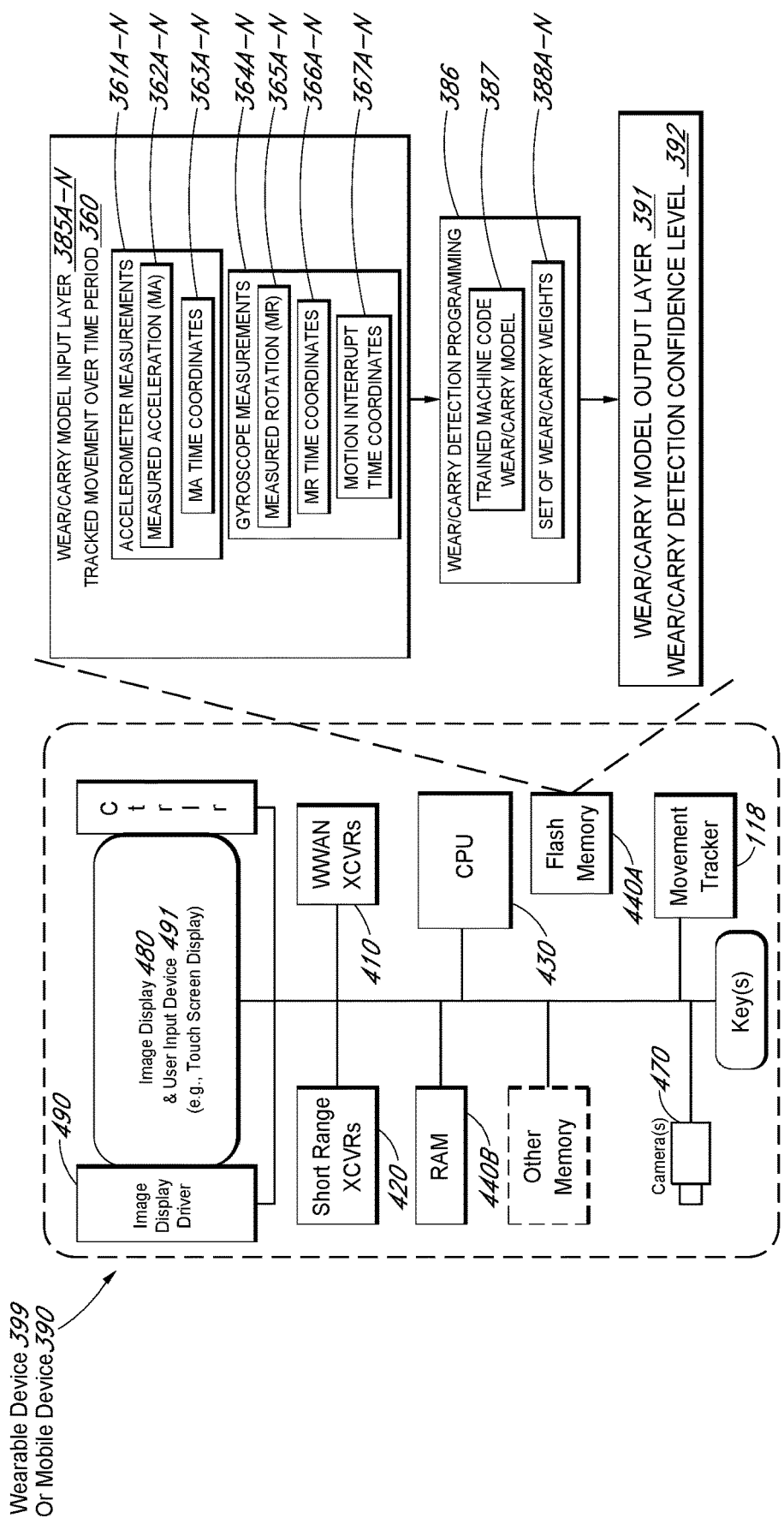
FIG. 4B shows an example of a hardware configuration for the wearable device or the mobile device of the neural network system of FIGS. 3C-D, which includes the movement tracker to detect wear of the wearable device or carrying of the mobile device based on a neural network model.

FIG. 4B shows an example of a hardware configuration for the wearable device 399 or the mobile device 390 of the neural network system 300 of FIGS. 3C-D, which includes the movement tracker 118 to detect wear of the wearable device 399 or carrying of the mobile device 390 based on a neural network model. As shown in FIG. 4B, the wear 386 detection programming 345 implemented in the wearable device 399 for wear detection or the carry detection programming 386 implemented in the mobile device 390 for carry detection is identical to that shown in FIG. 3C for the eyewear device 100. The wear or carry neural network programming 353 of FIG. 3D trains the wear detection programming 386 for the wearable device 399 and the carry detection programming 386 for the mobile device 390 in the exact same manner as the eyewear device 100. However, because the wear or carry training data 351A-N and the wear or carry model input layer 385A-N varies on the type and value of taken measurements on the movement tracker 118, as well as the form factor of the eyewear device 100, wearable device 399, and the mobile device 390, the set of weary or carry weights 388A-N and trained machine code wear or carry model 387 will vary device to device. As a result, the wear or carry detection programming 386 is inherently device specific.

Figure 4C:
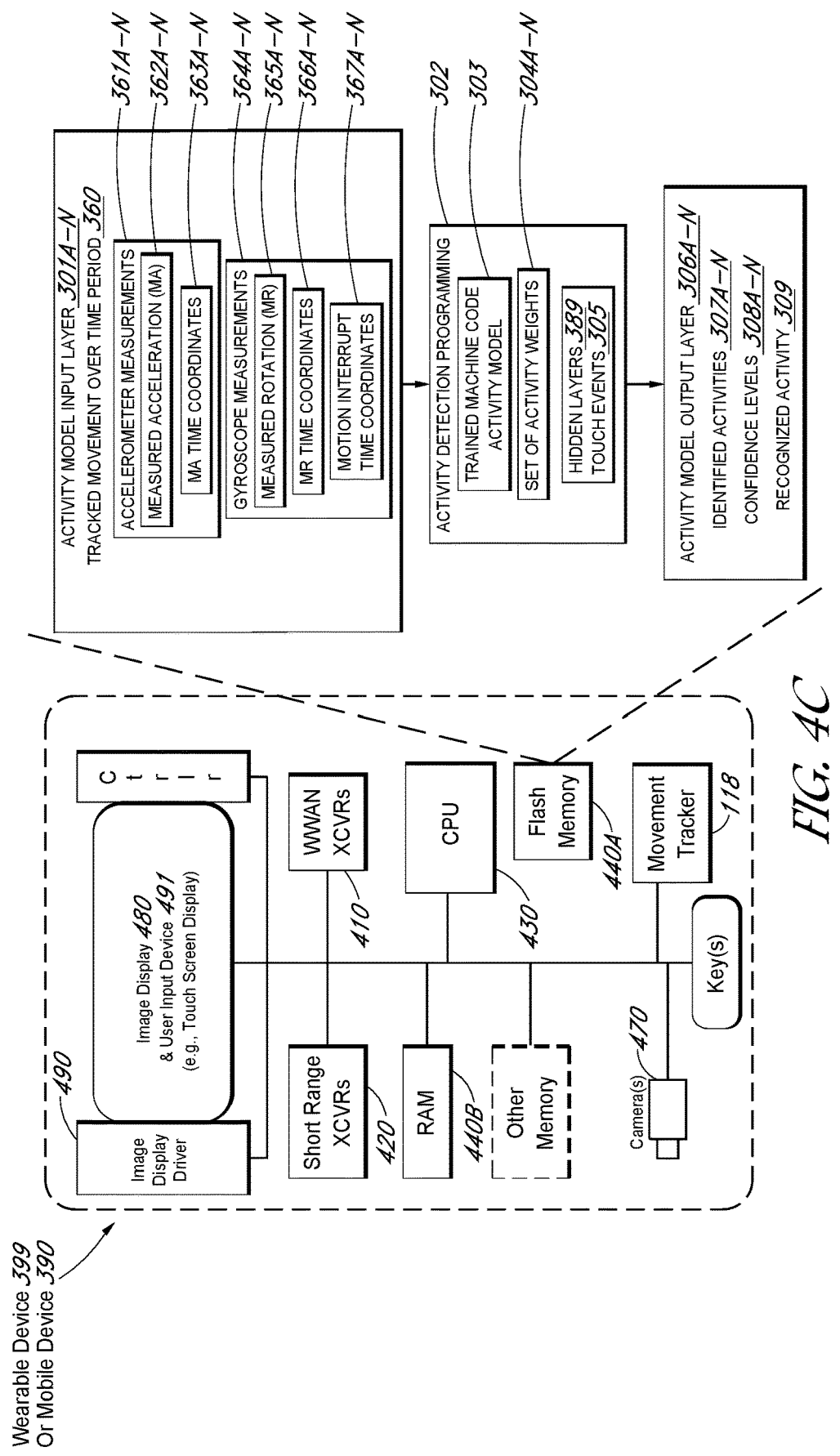
FIG. 4C shows an example of a hardware configuration for the wearable device or the mobile device of the neural network system of FIGS. 3E-F, which includes the movement tracker to identify activities based on a neural network model.

FIG. 4C shows an example of a hardware configuration for the wearable device 399 or the mobile device 390 of the neural network system 300 of FIGS. 3E-F, which includes the movement tracker 118 to identify activities based on a neural network model. As shown in FIG. 4C, the activity detection programming 302 implemented in the wearable device 399 or mobile device 390 for activity detection is identical to that shown in FIG. 3E for the eyewear device 100. The activity neural network programming 312 of FIG. 3F trains the activity detection programming 302 for the wearable device 399 and the mobile device 390 in the exact same manner as the eyewear device 100. However, because the activity training data 310A-N and the activity model input layer 301A-N varies on the type and value of taken measurements on the movement tracker 118, as well as the form factor of the eyewear device 100, wearable device 399, and the mobile device 390, the set of activity weights 304A-N and trained machine code activity model 303 will vary device to device. As a result, the activity detection programming 302 is inherently device specific.

As shown in FIGS. 4A-C, the wearable device 399 or the mobile device 390 includes an image display 480 and an image display driver 490 to control the image display 480. In the example of FIG. 4A, the image display 480 and a user input device 491 are integrated together into a touch screen display. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIGS. 4A-C therefore provide block diagram illustrations of the example mobile device 390 and the wearable device 399 having a touch screen display for displaying content and receiving user input as (or as part of) the user interface.

The activities that are the focus of discussions here typically involve data communications related to detecting finger gestures, wearing/carrying, or activities of a wearable device (e.g., eyewear device 100) or the mobile device 390. As shown in FIGS. 4A-C, the mobile device 390 and the wearable device 399 includes at least one digital transceiver (XCVR) 410, shown as WWAN XCVRs, for digital wireless communications via a wide area wireless mobile communication network. The mobile device 390 and the wearable device 399 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390 and the wearable device 399, the mobile device 390 and the wearable device 399 can include a global positioning system (GPS) receiver. Alternatively, or additionally the mobile device 390 and the wearable device 399 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 410, 420.

The transceivers 410, 420 (network communication interface) conforms to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 or the wearable device 399 for the neural network system 300.

Several of these types of communications through the transceivers 410, 420 and a network, as discussed previously, relate to protocols and procedures in support of communications with the eyewear device 100 or the server system 398 for detecting finger gestures, wearing, carrying, or activities. Such communications, for example, may transport packet data via the short range XCVRs 420 over the wireless connections 325 and 337 to and from the eyewear device 100 as shown in FIGS. 3A, 3C, and 3E. Such communications, for example, may also transport data utilizing IP packet data transport via the WWAN XCVRs 410 over the network (e.g., Internet) 395 shown in FIGS. 3B, 3D, and 3F. Both WWAN XCVRs 410 and short range XCVRs 420 connect through radio frequency (RF) send-and-receive amplifiers (not shown) to an associated antenna (not shown).

The wearable device 399 and the mobile device 390 further includes a microprocessor, shown as CPU 430, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 430 or processor hardware in smartphone, laptop computer, and tablet.

The microprocessor 430 serves as a programmable host controller for the mobile device 390 and the wearable device 399 by configuring the mobile device 390 and the wearable device 399 to perform various operations, for example, in accordance with instructions or programming executable by processor 430. For example, such operations may include various general operations of the mobile device 390 or wearable device 399, as well as operations related to the gesture detection programming 345, wear/carry detection programming 386, or activity detection programming 302, and communications with the eyewear device 100 and server system 398. Although a processor may be configured by use of hardwired logic, typical processors in mobile devices are general processing circuits configured by execution of programming.

The mobile device 390 and the wearable device 399 includes a memory or storage device system, for storing data and programming. In the example, the memory system may include a flash memory 440A and a random access memory (RAM) 440B. The RAM 440B serves as short term storage for instructions and data being handled by the processor 430, e.g. as a working data processing memory. The flash memory 440A typically provides longer term storage. Mobile device 390 and the wearable device 399 can include a visible light camera 470.

In the example of mobile device 390 or the wearable device 399, the flash memory 440A is used to store programming or instructions for execution by the processor 430. For speed and efficiency as previously explained, the gesture detection programming 345, wear/carry detection programming 386, or activity detection programming 302 of the eyewear device 100 may be implemented in firmware. Gesture detection programming 345, wear/carry detection programming 386, or activity detection programming 302 may be stored locally in a read-only memory (ROM), erasable programmable read-only memory (EPROM), or flash memory 440A.

Alternatively or additionally, the gesture detection programming 345, wear/carry detection programming 386, or activity detection programming 302 can be implemented in the application layer or have portions residing at the application layer, as described previously. Hence, depending on the type of device, the mobile device 390 and the wearable device 399 stores and runs a mobile operating system through which specific applications, including gesture detection programming 345, wear/carry detection programming 386, activity detection programming 302, and communications with the eyewear device 100 and server system 398, are executed. Applications may be a native application, a hybrid application, or a web application (e.g., a dynamic web page executed by a web browser) that runs on mobile device 390 or wearable device 399. Examples of mobile operating systems include Google Android, Apple iOS (I-Phone or iPad devices), Windows Mobile, Amazon Fire OS, RIM BlackBerry operating system, or the like.

Figure 5:
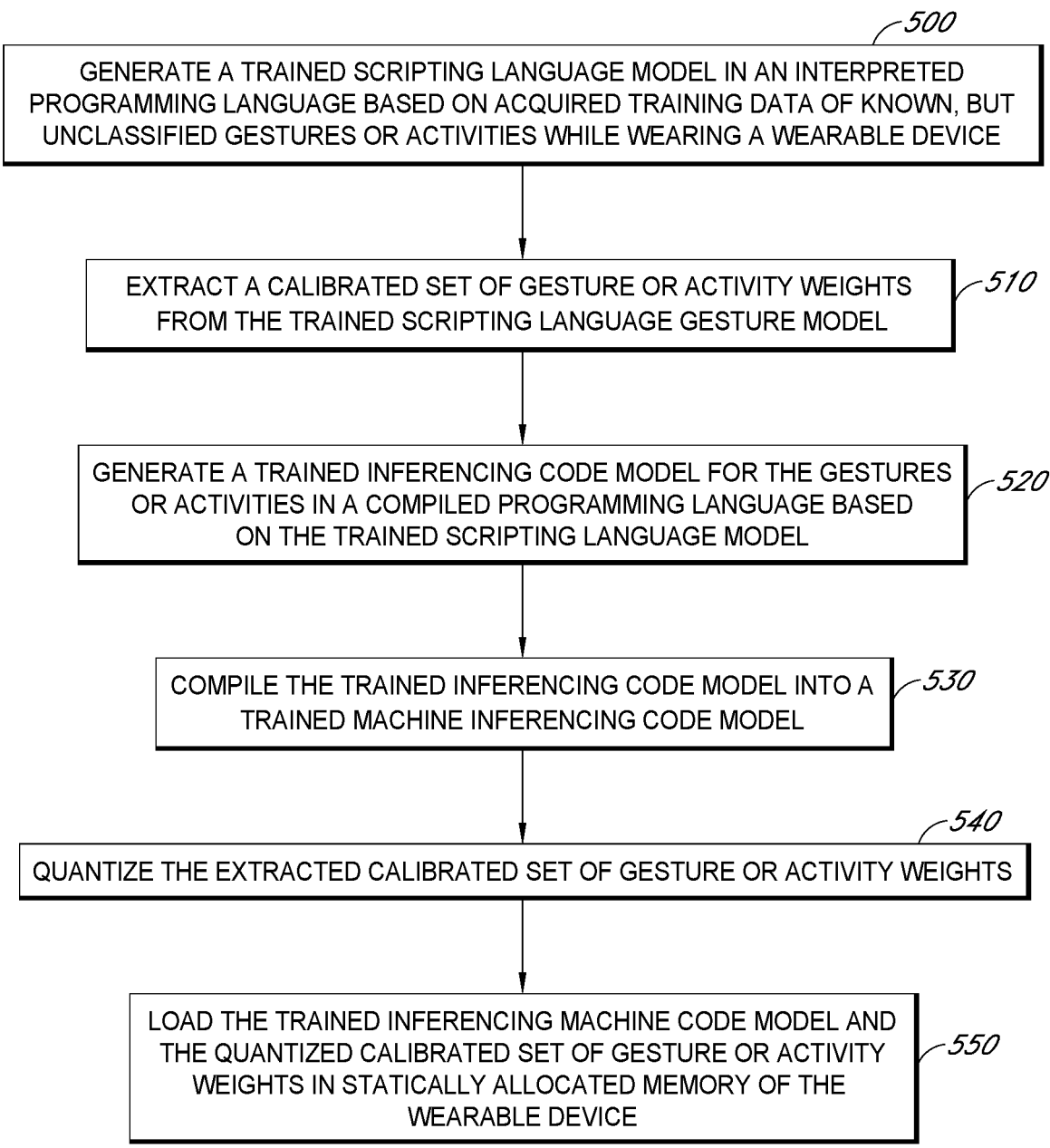
FIG. 5 is a flowchart of a method that can be implemented in the neural network system 300 of FIGS. 3B, 3D, and 3F to optimize execution speed and efficiency of the generated neural network model for gesture, wear, carry, or activity identification.

FIG. 5 is a flowchart of a method that can be implemented in the neural network system 300 of FIGS. 3B, 3D, and 3F to optimize execution speed and efficiency of the generated neural network model for gesture, wear, carry, or activity identification. It should be understood that in other examples the training model can be generated in any language, interpreted or native. The training model can be generated on the CPU, GPU, FPGA or ASIC—it really doesn't matter how it is generated as long as it is able to optimize/calculate the weights of the network based on the training data. Beginning in block 500, a trained scripting language model in an interpreted programming language based on acquired training data 376A-N, 310A-N that includes tracked movement over time intervals of known, but unclassified gestures 377A-N or activities 311A-N occurring while a wearable device 399 (e.g., eyewear device 100) is worn and also when the wearable device 399 is not being worn is generated. For wear detection, the trained scripting language model is generated based on acquired training data 351A-N of tracked movement over time intervals during wearing of the wearable device 399 (e.g., eyewear device 100) and when the wearable device 399 is not being worn. For carry detection, the trained scripting language model is generated based on acquired training data 351A-N of tracked movement over time intervals during carrying of the mobile device 390 and when the mobile device 390 is not being carried.

In the gesture identification example, accelerometer training data is collected during double tap (or other multiple taps, such as a triple tap) gestures on either side of the eyewear device 100, using custom firmware for data collection. The last 800 ms or other time interval(s) of accelerometer samples for the training data are collected in an embedded multi-media controller (EMMC), along with an indication which lateral side 170A-B, chunk 110A-B, or other input surface 181 the tap gesture occurred. This process is called training data labeling. For each individual data element, a label is created, typically by a human that specifies the gesture. For example, for the double tap detector, the labels are none, left side, right side. Additionally, a large number of samples for non-target gestures training data is collected; this is the null class. In some examples, this data can be split into a training and test data set. The convolutional neural network (CNN) is trained on this acquired training data (using a 1-dimensional convolution layer over the temporal dimension of the previous mentioned features). Keras, a high-level neural network API, written in Python and capable of running on top of TensorFlow, CNTK, or Theano, can be used to train the model and generate the trained scripting language gesture model. Keras is just one example of a framework that can be used to train neural networks. One can use TensorFlow, CNTK or Theano directly or use any other neural network training framework. This can be extended to any other framework.

In the wear or activity identification example, the inertial measurement unit (IMU) features are collected as training data during wear/no wear sessions, using custom firmware to save the IMU training data with a label to the EMMC in comma separated value (CSV) format indicating the type of IMU measurement. The IMU features (e.g., training data) include: acceleration (X, Y, Z); gyroscope (pitch, yaw, roll)—rotational acceleration; time (e.g., milliseconds) since the last motion interrupt (e.g., an interrupt fires if motion occurs after 4 seconds of no motion); and time (e.g., milliseconds) since last no motion interrupt (interrupt fires if device is idle for 4 consecutive seconds). Each of these features are sampled at a sampling rate frequency of 100 Hz. Users of the wearable device 399 (e.g., eyewear device 100) collect data during various activities or settings of wearing or not wearing the device, for example: biking (e.g., wearing eyewear device 100 or having eyewear device 100 in a backpack), swimming, jogging, and driving. The wear training data is downloaded from the eyewear device 100, split data into a training or test data set. The convolutional neural network (CNN) is trained on data (using a 1-dimensional convolution layer over the temporal dimension of the previous mentioned training data features). The following parameters can be utilized with a randomized grid search. First, a sampling rate (100 Hz is faster than needed, so down sampling can be used as needed), for example, a 300 ms sampling rate can be used. The slower the sampling rate, the less memory needed to use for a single model evaluation (but at a point performance takes a hit). Second, window size (i.e., how many consecutive samples are examined at a given time, for example, 6 seconds of samples can be used. Third, various neural network hyper parameters (e.g., number of layers, activation functions, loss functions, etc.) can be utilized. Keras can be used to train the model and generate the trained scripting language gesture model.

Once a trained scripting language model for gesture, wear, carry, or activity detection that is satisfactory is generated, the next challenge is deploying that trained scripting language model to a microcontroller (where computing resources are limited, e.g., extremely limited in flash and RAM memory). What this means, is the number of weights in the model and how much data is need in memory at any given time is very important.

Moving to block 510, a calibrated set of gesture weights 347A-N, wear/carry weights 388A-N, or activity weights 304A-N is extracted from the trained scripting language gesture model. To address the limited computing resources of the microcontroller of the wearable device 399 or the mobile device 390, a generic framework that consists of two main parts can be utilized. First, a Python script takes the trained scripting language model (e.g., Keras based) for gesture, wear, carry, or activity detection and generates C code of the weights, and a C application programming interface (API) to perform the inference step.

Hence, continuing to block 520, a trained inference code model for the gestures, wear/carry, or activity detection in a compiled programming is generated language based on the trained scripting language model. For example, the trained scripting language model generated with Keras is written in Python, and is passed into a Keras exporter, which generates an exported C code model. In addition, a C code static library implementation of many common neural network abstractions (e.g., dense layers, convolutional layers, various activation functions etc.) is written in C code and is used by the exported C code model. While Keras2CPP is an open-source tool that can port Keras Python models into C++ code, the ported code includes a lot of modern C++ (including many Standard Template Libraries (STL), dynamic memory allocation, etc.) and the library code is too large to easily fit in many modern microcontrollers. The trained inference code model in the C language implementation requires no dynamic memory allocation and the code size is more than an order of magnitude smaller (with the same compilation flags, optimizing for size, etc.).

Moving to block 530, the trained inference code model is compiled into a trained machine inference code model. For gesture detection, the size of the compiled Keras2CPP library size is 14,128 bytes of text, 2,330 bytes of data, 1 byte of statically allocated data, for a total of 16,479 bytes. The size of the compiled machine code from the C code static library implementation of common neural network abstractions is 444 bytes of text, 0 bytes of data, for a total of 444 bytes, which reduces the memory required for the gesture detection programming 345, wear/carry detection programming 386, or activity detection programming 302 loaded in the wearable device (e.g., eyewear device 100) or mobile device 390 dramatically. This is just one example and the size reduction varies quite a bit from model-to-model, however, the takeaway is that procedure enables deployment neural networks to micro controllers using only a few hundred bytes of flash and a few hundred bytes of RAM.

Proceeding now to block 540, the extracted calibrated set of gesture weights 347A-N, wear/carry weights 388A-N, or activity weights 304A-N are quantized. Quantization converts weights that are stored in floating point format (e.g., at least 32 bit IEEE standard floating point) into 8 bit numbers, which reduces the memory required for the gesture detection programming 345, wear/carry detection programming 386, activity detection programming 302 by a factor of 4 times (4×) with negligible performance degradation.

Finishing now in block 550, the trained inference machine code model and the quantized calibrated set of gesture weights 347A-N, wear/carry weights 388A-N, or activity weights 304A-N are loaded in statically allocated memory of the wearable device 399 (e.g., eyewear device 100) or the mobile device 390, as opposed to dynamically allocated memory. These components comprise the gesture detection programming 345, wear/carry detection programming 386, or activity detection programming 302.

Once the optimized C code neural network model is generated and compiled into machine code, the model is called from application firmware to identify gestures, detect wear of the wearable device 399 (e.g., eyewear device 100) or carrying of the mobile device 390, and identifying any activities performed during wearing of the wearable device 399. For gesture detection, on a tap motion interrupt 367A-N from the IMU, the last 800 ms of accelerometer measurements 361A-N from the movement tracker 118 are run through the trained machine code gesture model 346 to detect double tap gestures on either side of the eyewear device 100. Based on the side of the double tap on the eyewear device 100, a different operation is implemented in the trained machine code gesture model 346. An example, generated C code API for double tap detection takes accelerometer measurements 361A-N over time as an input layer array from the last 800 milliseconds (ms) and outputs a probability (confidence level 371A-N) output layer array for three classes: no double tap, left temple 125A double tap, and right temple 125B double tap. An example, generated C code API for wear detection takes accelerometer measurements 361A-N, gyroscope measurements 364A-N, and motion data (e.g., motion interrupt time coordinates 367A-N) from the IMU over time as an input layer array and outputs an output layer that is a single probability (confidence level 392) that the eyewear device 100 is being worn. An example, generated C code API for activity detection takes accelerometer measurements 361A-N, gyroscope measurements 364A-N, and motion data (e.g., motion interrupt time coordinates 367A-N) from the IMU over time as an input layer array and outputs a probability output layer array that includes 4 classes 307A-N and confidence levels 308A-N: biking, swimming, jogging, and driving. The input (e.g., 301A-N) and output (306A-N) layer arrays are statically allocated instead of dynamically allocated to improve runtime. Of course, the size of the input and output layer arrays will vary depending on the number of gestures and activities.

FIGS. 6-9 illustrate several examples of multiple finger contact detected touch events and identified finger gestures on an input surface 181 of the eyewear device 100. In each of the examples of FIGS. 6-9, the function to detect the at least one touch event 349A-N on the input surface 181 based on the at least one finger contact 179 inputted from the user includes the following functions. Detect a first touch event 349A on the input surface 181 based on a first taken measurement 362A, 365A at a first time coordinate 363A, 366A, 367A corresponding to a first finger contact 179A inputted from the user at a first input time. Detect a second touch event 349B on the input surface 181 based on a second taken measurement 362B, 365B taken at a second time coordinate 363B, 366B, 367B corresponding to a second finger contact 179B inputted from the user at a second input time within the tracked time period. The function to identify the finger gesture is based on the first and second detected touch events 349A-B, the first time coordinate 363A, 366A, 367A and the second time coordinate 363B, 366B, 367B.

Figures 6A, 6B, 6C:
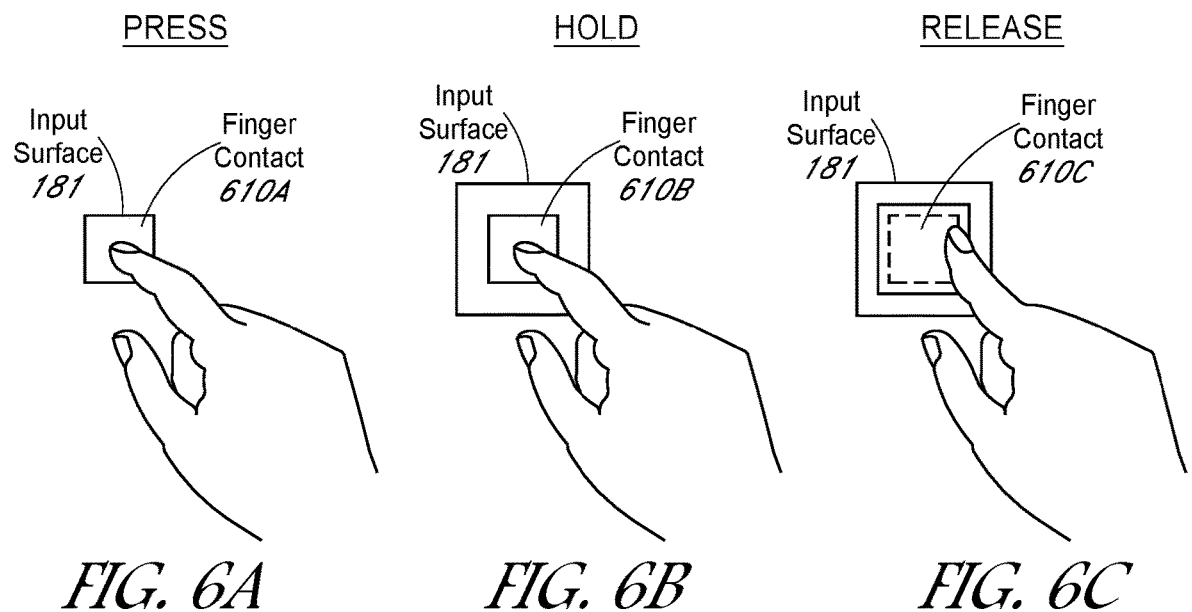
FIGS. 6A, 6B, and 6C illustrate press and hold detected touch events on the input surface of the eyewear device.

FIGS. 6A-C illustrate press and hold detected touch events on the input surface 181. As shown, multiple finger contacts occur on the input surface 181, which include pressing (the first finger contact 610A), holding (the second finger contact 610B), and no finger contact 610C by releasing the input surface 181. Accordingly, the first and second detected touch events are a press and hold on the input surface 181. The identified finger gesture is a press and hold of a graphical user interface element in the image presented on the image display. The adjustment to the image presented on the image display based on the identified finger gesture is configured to allow a drag and drop (e.g., move) of the graphical user interface element on the image display or provide display options (e.g., a context menu associated with the graphical user interface element).

Figure 7:
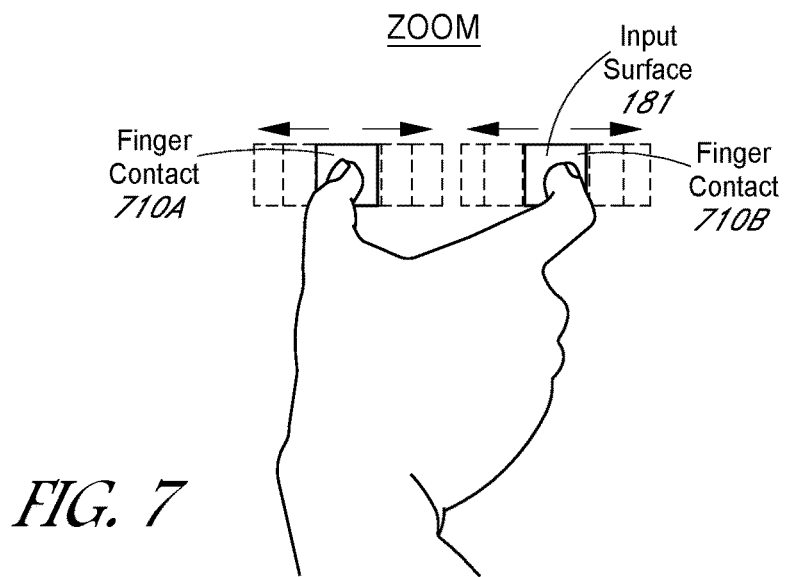
FIG. 7 illustrates finger pinching and unpinching detected touch events on the input surface of the eyewear device.

FIG. 7 illustrates finger pinching and unpinching detected touch events on the input surface 181. Multiple finger contacts occur on the input surface 181, in which two fingers (first finger contact 710A and second finger contact 710B) move apart from each other (finger unpinching) or move toward each other (finger pinching). In the finger pinching detected touch event example, the first and second detected touch events are finger pinching on the input surface 181. The identified finger gesture is a zoom in of the image presented on the image display. The adjustment to the image presented on the image display based on the identified finger gesture zooms in on the image presented on the image display.

In the finger unpinching detected touch event example, the first and second detected touch events are finger unpinching on the input surface 181. The identified finger gesture is a zoom out of the image presented on the image display. The adjustment to the image presented on the image display based on the identified finger gesture zooms out of the image presented on the image display.

Figure 8:
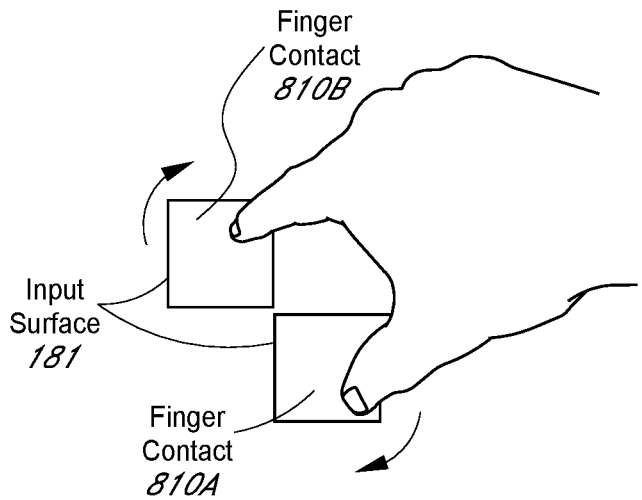
FIG. 8 illustrates finger rotation detected touch events on the input surface of the eyewear device.

FIG. 8 illustrates finger rotation detected touch events on the input surface 181. As shown, multiple finger contacts occur on the input surface 181, which include continuously rotating two fingers in a circle from two initial points, a first finger contact 810A and a second finger contact 810B, to two final points of contact for those two fingers. In some examples, only one finger may be rotated in a circle. The first and second detected touch events are finger rotation on the input surface 181. The identified finger gesture is a finger rotation of the image presented on the image display. The adjustment to the image presented on the display based on the identified finger gesture rotates the image presented on the image display, for example, to rotate a view. The rotation gesture is can occur when two fingers rotate around each other.

Figure 9:
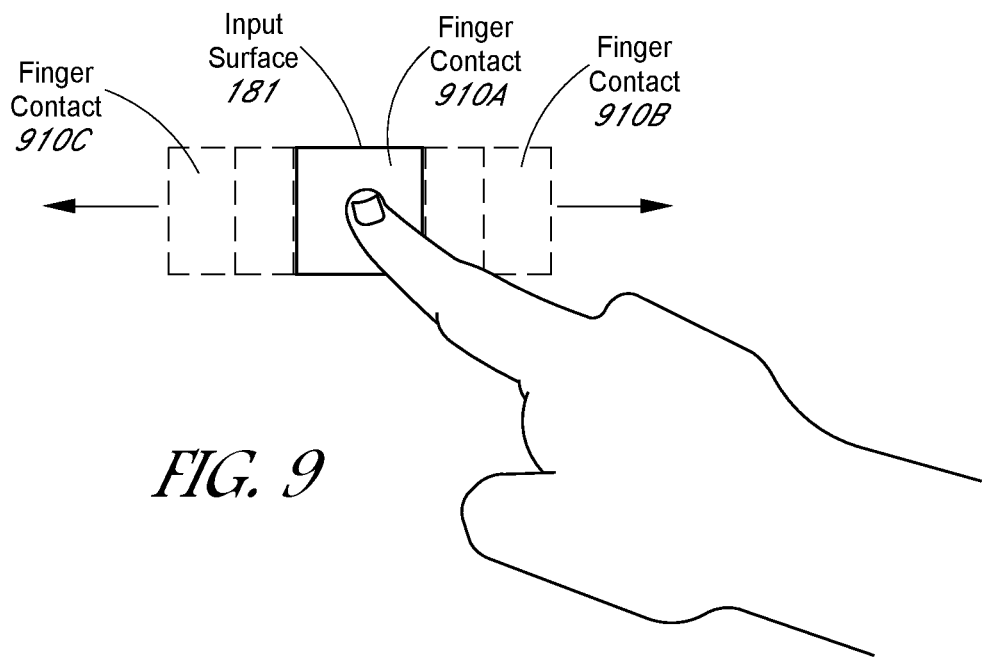
FIG. 9 illustrates finger swiping detected touch events on the input surface of the eyewear device.

FIG. 9 illustrates finger swiping detected touch events on the input surface 181. As shown, multiple finger contacts occur on the input surface 181, which include dragging one finger left or right from a point of initial finger contact 910A to a final point of second finger contact 910B or 910C. The first and second detected touch events are finger swiping from front to back (910A to 910C) or back to front (910A to 910B) on the input surface 181. The identified finger gesture is a scroll of the image presented on the image display. The adjustment to the image presented on the image display based on the identified finger gesture scrolls the image presented on the image display. As shown, such a scroll or swipe gesture can occur when the user moves one or more fingers across the screen in a specific horizontal direction without significantly deviating from the main direction of travel, however, it should be understood that the direction of travel can be vertical as well.

Any of the functions described herein for gesture, wear, activity, or carry detection of the wearable device (e.g., eyewear device 100), mobile device 390, and server system 398 can be embodied in on one or more methods as method steps or in one more applications as described previously. According to some embodiments, "programming," an "application," "applications," or "firmware" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for the fingerprint sensor, user authorization, navigation, or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the wearable device 399 (e.g., eyewear device 100) and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A neural network system comprising:
an eyewear device, including:
  a frame;
  an image display supported by the frame to present an image to a user;
  an image display driver coupled to the image display to control the image presented to the user;
  a movement tracker to track movement of the eyewear device, the movement tracker including:
    (i) at least one accelerometer to measure acceleration,
    (ii) at least one gyroscope to measure rotation, or
    (iii) an inertial measurement unit having the at least one accelerometer and the at least one gyroscope;
a memory;
a processor coupled to the image display driver, the movement tracker, and the memory; and
wear detection programming in the memory, wherein execution of the wear detection programming by the processor configures the eyewear device to perform functions, including functions to:
  track, via the movement tracker, movement of the eyewear device by:
    (i) measuring, via the at least one accelerometer, the acceleration of the eyewear device,
    (ii) measuring, via the at least one gyroscope, the rotation of the eyewear device, or
    (iii) measuring, via the inertial measurement unit, both the acceleration and the rotation of the eyewear device; and detect whether the user is wearing the eyewear device by applying the tracked movement of the eyewear device over a time period to a neural network recognized wear model, wherein the function to detect whether the user is wearing the eyewear device based on the tracked movement over the time period includes functions to:
apply multiple model inputs that include taken measurements of, (i) the measured acceleration via the accelerometer, (ii) the measured rotation via the least one gyroscope, or (iii) both the measured acceleration and the rotation via the inertial measurement unit taken at sampling frequency during the time period to the neural network recognized wear model to determine similarity of the tracked movement to a recognized movement in the neural network recognized wear model, wherein the neural network recognized wear model includes a set of wear weights based on acquired training data of: (i) acceleration, (ii) rotation, or (iii) both the acceleration and the rotation over one or more time intervals; and
determine a model output that includes a respective confidence level of each respective recognized movement based on that determined similarity of the tracked movement to the respective recognized movement.

2. The neural network system of claim 1, wherein:
execution of the programming by the processor further configures the eyewear device to perform functions, including functions to:
in response to detecting that the user is wearing the eyewear device, identify an activity of the user wearing the eyewear device based on the tracked movement over the time period; and
adjust an image presented on the image display of the eyewear device based on a recognized activity-based adjustment of the identified activity.

3. The neural network system of claim 2, wherein:
the recognized activity-based adjustment includes:
launch, hide, or display of an application for the user to interact with or utilize;
display of a menu of applications related to the identified activity for execution;
control of a contextual notification to enable, disable, or restrict features of an application;
enable or disable of a system level feature; or
a combination thereof.

4. The neural network system of claim 2, wherein:
the processor comprises a first processor and a second processor;
the memory comprises a first memory and a second memory;
the eyewear device includes:
the first processor;
the first memory;
activity detection programming in the first memory, wherein execution of the activity detection programming by the first processor configures the eyewear device to perform the functions to:
track, via the movement tracker, the movement of the eyewear device;
in response to detecting that the user is wearing the eyewear device, identify the activity of the user wearing the eyewear device based on the tracked movement over the time period; and
adjust the image presented on the image display of the eyewear device based on the recognized activity-based adjustment of the identified activity;

the neural network system further comprises a host computer, the host computer including:
the second processor;
the second memory including training data of: (i) acceleration, (ii) rotation, or (iii) both the acceleration and the rotation over one or more time intervals of an unclassified activity and a recognized activity model;
activity neural network programming in the second memory, wherein execution of the activity neural network programming by the second processor configures the host computer to perform functions, including functions to:
before execution of the wear detection programming by the first processor of the eyewear device:
acquire the training data of: (i) acceleration, (ii) rotation, or (iii) both the acceleration and the rotation of the eyewear device over one or more time intervals of the unclassified activity;
build the recognized activity model of the unclassified activity based on the acquired training data, the function to build the recognized activity model including functions to:
calibrate a set of activity weights of the unclassified activity from the acquired training data of the unclassified activity; and
store the calibrated set of activity weights in the recognized activity model in association with the recognized activity.

5. The neural network system of claim 1, wherein the eyewear device further comprises a temple extending from a lateral side of the frame.

6. The neural network system of claim 5, wherein:
the eyewear device further comprises:
a chunk integrated into or connected to the frame on the lateral side; and
the chunk includes a circuit board that includes the movement tracker.

7. The neural network system of claim 1, wherein:
the movement tracker is further configured to track over the time period a respective time coordinate for each taken measurement of: (i) the measured acceleration via the accelerometer, (ii) the measured rotation via the least one gyroscope, or (iii) both the measured acceleration and the rotation via the inertial measurement unit;
the execution of the programming by the processor further configures the eyewear device to perform functions, including functions to track, via the movement tracker, the respective time coordinate for each taken measurement; and
the function of detecting whether the user is wearing the eyewear device based on the tracked movement over the time period is further based on the respective time coordinate for each taken measurement.

8. The neural network system of claim 1, wherein:
the functions to apply the multiple model inputs to determine similarity of the tracked movement to the recognized movement in the neural network recognized wear model and determine the model output are embedded as firmware programming in the eyewear device.

9. A neural network method for use with an eyewear device including a frame, an image display supported by the frame to present an image to a user, an image display driver coupled to the image display to control the image presented to the user, a movement tracker to track movement of the eyewear device, the movement tracker including at least one accelerometer to measure acceleration, at least one gyroscope to measure rotation, or an inertial measurement unit having the at least one accelerometer and the at least one gyroscope, the method comprising:

tracking, via the movement tracker, movement of the eyewear device by:
(i) measuring, via the at least one accelerometer, the acceleration of the eyewear device,
(ii) measuring, via the at least one gyroscope, the rotation of the eyewear device, or
(iii) measuring, via the inertial measurement unit, both the acceleration and the rotation of the eyewear device; and detecting whether the user is wearing the eyewear device by applying the tracked movement of the eyewear device over a time period to a neural network recognized wear model, wherein detecting whether the user is earing the eyewear device based on the tracked movement over the time period includes:

applying multiple model inputs that include taken measurements of, (i) the measured acceleration via the accelerometer, (ii) the measured rotation via the least one gyroscope, or (iii) both the measured acceleration and the rotation via the inertial measurement unit taken at sampling frequency during the time period to the neural network recognized wear model to determine similarity of the tracked movement to a recognized movement in the neural network recognized wear model, wherein the neural network recognized wear model includes a set of wear weights based on acquired training data of, (i) acceleration, (ii) rotation, or (iii) both the acceleration and the rotation over one or more time intervals, and determining a model output that includes a respective confidence level of each respective recognized movement based on the determined similarity of the tracked movement to the respective recognized movement.

10. The neural network method of claim 9, further comprising:
in response to detecting that the user is wearing the eyewear device, identifying an activity of the user wearing the eyewear device based on the tracked movement over the time period; and
adjusting an image presented on an image display of the eyewear device based on a recognized activity-based adjustment of the identified activity.

11. The neural network method of claim 10, wherein the adjusting comprises:
launching, hiding, or displaying of an application for the user to interact with or utilize;
displaying a menu of applications related to the identified activity for execution;
controlling a contextual notification to enable, disable, or restrict features of an application;
enabling or disabling a system level feature; or
a combination thereof.

12. The neural network method of claim 10, wherein:
a first processor of the eyewear device is configured to:
track, via a movement tracker, the movement of the eyewear device;
in response to detecting that the user is wearing the eyewear device, identify the activity of the user wearing the eyewear device based on the tracked movement over the time period; and adjust the image presented on the image display of the eyewear device based on the recognized activity-based adjustment of the identified activity; and
a second processor of a host computer is configured to:
acquire training data of: (i) acceleration, (ii) rotation, or (iii) both the acceleration and the rotation of the eyewear device over one or more time intervals of unclassified activity;
build a recognized activity model of the unclassified activity based on the acquired training data by calibrating a set of activity weights of the unclassified activity from the acquired training data of the unclassified activity and storing the calibrated set of activity weights in the recognized activity model in association with the recognized activity.

13. The neural network method of claim 9, wherein the eyewear device further comprises a temple extending from a lateral side of the frame.

14. The neural network method of claim 13, wherein:
the eyewear device further comprises:
a chunk integrated into or connected to the frame on the lateral side; and
the chunk includes a circuit board that includes the movement tracker.

15. The neural network method of claim 9, further comprising:
tracking over the time period a respective time coordinate for each taken measurement of:
(i) the measured acceleration via the accelerometer, (ii) the measured rotation via the least one gyroscope, or (iii) both the measured acceleration and the rotation via the inertial measurement unit;
wherein detecting whether the user is wearing the eyewear device based on the tracked movement over the time period is based on the respective time coordinate for each taken measurement.

16. The neural network method of claim 9, wherein:
applying the multiple model inputs to determine similarity of the tracked movement to the recognized movement in the neural network recognized wear model and determine the model output are performed by the eyewear device.

17. A non-transitory computer readable medium including instructions for implementing a neural network method on an eyewear device including a frame, an image display supported by the frame to present an image to a user, an image display driver coupled to the image display to control the image presented to the user, a movement tracker to track movement of the eyewear device, the movement tracker including at least one accelerometer to measure acceleration, at least one gyroscope to measure rotation, or an inertial measurement unit having the at least one accelerometer and the at least one gyroscope, the instructions, when executed by a processor of the eyewear device configure the eyewear device to:
track, via the movement tracker, movement of the eyewear device by:
measuring, via the at least one accelerometer, the acceleration of the eyewear device,
(ii) measuring, via the at least one gyroscope, the rotation of the eyewear device, or
(iii) measuring, via the inertial measurement unit, both the acceleration and the rotation of the eyewear device; and
detect whether the user is wearing the eyewear device by applying the tracked movement of the eyewear device over a time period to a neural network recognized wear model, wherein to detect whether the user is wearing the eyewear device based on the tracked movement over the time period includes configuring the eyewear device to:

apply multiple model inputs that include taken measurements of, (i) the measured acceleration via the accelerometer, (ii) the measured rotation via the least one gyroscope, or (iii) both the measured acceleration and the rotation via the inertial measurement unit taken at sampling frequency during the time period to the neural network recognized wear model to determine similarity of the tracked movement to a recognized movement in the neural network recognized wear model, wherein the neural network recognized wear model includes a set of wear weights based on acquired training data of, (i) acceleration, (ii) rotation, or (iii) both the acceleration and the rotation over one or more time intervals; and determine a model output that includes a respective confidence level of each respective recognized movement based on the determined similarity of the tracked movement to the respective recognized movement.

18. The non-transitory computer readable medium of claim 17, the instructions, when executed by the processor of the eyewear device further configure the eyewear device to:

in response to detecting that the user is wearing the eyewear device, identify an activity of the user wearing the eyewear device based on the tracked movement over the time period; and adjust an image presented on an image display of the eyewear device based on a recognized activity-based adjustment of the identified activity.

* * * * *